US012614985B2

(12) United States Patent
Ou et al.

(10) Patent No.: US 12,614,985 B2
(45) Date of Patent: Apr. 28, 2026

(54) LLC CONVERTER, CONTROL CIRCUIT, SOFT START METHOD, APPARATUS, AND CHIP

(71) Applicant: HUAWEI TECHNOLOGIES CO., LTD., Shenzhen (CN)

(72) Inventors: Shousong Ou, Dongguan (CN); Zhengdong Jiang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 325 days.

(21) Appl. No.: 18/451,963

(22) Filed: Aug. 18, 2023

(65) Prior Publication Data

US 2023/0396176 A1 Dec. 7, 2023

Related U.S. Application Data

(63) Continuation of application No. PCT/CN2021/077115, filed on Feb. 20, 2021.

(51) Int. Cl.
| | |
|---|---|
| *H02M 3/335* | (2006.01) |
| *H02M 1/00* | (2006.01) |
| *H02M 1/36* | (2007.01) |

(52) U.S. Cl.
CPC ..... *H02M 3/33569* (2013.01); *H02M 1/0009* (2021.05); *H02M 1/0058* (2021.05); *H02M 1/36* (2013.01)

(58) Field of Classification Search
CPC ........... H02M 3/33569; H02M 1/0009; H02M 1/0058; H02M 1/36; H02M 1/32; H02M 3/01
See application file for complete search history.

(56) References Cited

U.S. PATENT DOCUMENTS

| | | | |
|---|---|---|---|
| 6,154,375 A | 11/2000 | Majid et al. | |
| 11,979,086 B2 * | 5/2024 | Chin ................... | H02M 1/0009 |

(Continued)

FOREIGN PATENT DOCUMENTS

| | | |
|---|---|---|
| CN | 101666823 A | 3/2010 |
| CN | 103066853 A | 4/2013 |

(Continued)

OTHER PUBLICATIONS

International Search Report and Written Opinion issued in PCT Application No. PCT/CN2021/077115 dated Nov. 19, 2021.

(Continued)

*Primary Examiner* — Kyle J Moody

(57) ABSTRACT

This application provides an LLC converter, a control circuit, a soft start method, an apparatus, and a chip, to reduce start duration of the LLC converter and avoid generating a current impulse in a resonant tank. The LLC converter includes a control circuit, and a switch circuit and a resonant tank that are sequentially coupled and connected. The control circuit is configured to: generate a second drive signal based on the current of the resonant tank and a first drive signal, the second drive signal is at a preset level in a time period in which the current is greater than or equal to a current threshold, the second drive signal is used to turn off the power switch in the switch circuit, and the second drive signal is the same as the first drive signal in a time period in which the current is less than the current threshold.

17 Claims, 22 Drawing Sheets

(56) References Cited

U.S. PATENT DOCUMENTS

| | | |
|---|---|---|
| 2011/0164437 A1 | 7/2011 | Sun et al. |
| 2013/0121036 A1 | 5/2013 | Peng et al. |
| 2014/0313787 A1 | 10/2014 | Chen |
| 2014/0313790 A1 | 10/2014 | Feng et al. |

FOREIGN PATENT DOCUMENTS

| | | | |
|---|---|---|---|
| CN | 103138590 A | | 6/2013 |
| CN | 103647461 | * | 3/2014 |
| CN | 103647461 A | | 3/2014 |
| CN | 105099157 A | | 11/2015 |

OTHER PUBLICATIONS

Extended European Search Report issued in EP Application No. 21926147.6 dated Feb. 9, 2024.

* cited by examiner

LLC CONVERTER, CONTROL CIRCUIT, SOFT START METHOD, APPARATUS, AND CHIP

CROSS-REFERENCE TO RELATED APPLICATIONS

This application is a continuation of International Application No. PCT/CN2021/077115, filed on Feb. 20, 2021, the disclosure of which is hereby incorporated by reference in its entirety.

TECHNICAL FIELD

This application relates to the field of circuit technologies, and in particular, to an LLC converter, a control circuit, a soft start method, an apparatus, and a chip.

BACKGROUND

In the power conversion field, converting a direct current of one voltage into a direct current of another voltage and providing electric energy for a load (that is, direct current-to-direct current conversion) is a common power conversion requirement. Currently, many circuit topologies can implement a direct current-to-direct current conversion function. An inductor-inductor-capacitor (LLC) converter is a widely used direct current-to-direct current conversion circuit.

A soft switch technology is easily implemented in the LLC converter, to reduce a loss of a power switch in the circuit. In addition, the LLC converter easily operates at a high frequency, and a volume of a magnetic component is reduced. Therefore, the LLC converter has advantages such as high conversion efficiency and high power density.

Usually, when the LLC converter operates in a steady state phase, a frequency of the power switch in the LLC converter is close to an inherent resonance frequency of a resonant tank, and a duty cycle of a drive signal of each power switch is close to 50%. When the LLC converter operates in a start phase, a voltage of an output capacitor needs to reach an output voltage stably in a short period of time, to complete the start phase quickly and avoid damage to the power switch.

SUMMARY

This application provides an LLC converter, a control circuit, a soft start method, an apparatus, and a chip, to reduce start duration of the LLC converter and avoid generating a current impulse in a resonant tank.

According to a first aspect, an embodiment of this application provides an inductor-inductor-capacitor LLC converter, including a control circuit 407, and a switch circuit 402 and a resonant tank 403 that are sequentially coupled and connected. The switch circuit includes a power switch. The control circuit 407 is separately coupled to the switch circuit 402 and the resonant tank 403; and the control circuit 407 is configured to: detect a current of the resonant tank 403; generate a second drive signal based on the current and a first drive signal, where the first drive signal is a pulse signal having a fixed frequency and a fixed duty cycle, the second drive signal is a pulse signal, the second drive signal is at a preset level in a time period in which the current is greater than or equal to a current threshold, the second drive signal at the preset level is used to turn off a power switch in the switch circuit 402, and the second drive signal is the same as the first drive signal in a time period in which the current is less than the current threshold; and output the second drive signal to the switch circuit 402, where the second drive signal is used to drive the power switch in the switch circuit 402.

In the technical solution, the control circuit 407 may generate, based on a case of the first drive signal and whether the current of the resonant tank 403 exceeds the current threshold, the second drive signal used to drive the power switch in the switch circuit 402. In the time period in which the current of the resonant tank 403 is greater than or equal to the current threshold, in other words, when an overcurrent occurs in the resonant tank 403, a level of the second drive signal is a preset level used to drive the power switch, so that the power switch can be turned off, to avoid generating a current impulse in the resonant tank 403 and protect an element in the LLC converter. When the current of the resonant tank 403 is less than the current threshold, the control circuit 407 may generate the second drive signal that is the same as the first drive signal. In a start phase of an LLC converter, the control circuit 407 drives the power switch by using the second drive signal that is the same as the first drive signal, so that on duration of a switch in the switch circuit 402 is long, an output voltage can be quickly established, start duration of the LLC converter is shortened, and a start speed is improved. The control circuit 407 may flexibly adjust the drive signal of the power switch based on a case of the current of the resonant tank 403, to avoid generating a current impulse in the resonant tank 403 in a closed-loop control manner, and ensure the element in the LLC converter.

In a possible implementation, the control circuit 407 includes a current collection unit 407A, a logical signal generation unit 407B, a first drive signal generation unit 407C, and a second drive signal generation unit 407D. The current collection unit 407A is configured to detect the current of the resonant tank 403. The first drive signal generation unit 407C is configured to generate the first drive signal. The logical signal generation unit 407B is configured to generate a logical signal based on the current and the current threshold. The logical signal is a pulse signal, the current is less than the current threshold in a time period corresponding to a width of a pulse in the logical signal, and the current is greater than or equal to the current threshold within a time interval between two adjacent pulses in the logical signal. The second drive signal generation unit 407D is configured to generate the second drive signal based on the logical signal and the first drive signal.

In a possible implementation, the second drive signal generation unit 407D is specifically configured to:

perform AND logical operation processing on the logical signal and the first drive signal, to obtain the second drive signal, where a level of the logical signal is a high level in the time period in which the current is less than the current threshold, and the level of the logical signal is a low level in the time period in which the current is greater than or equal to the current threshold.

In the technical solution, the second drive signal generation unit 407D in the control circuit 407 may generate the second drive signal by performing AND logical operation processing on the logical signal and the first drive signal. The second drive signal generation unit 407D may be an analog signal circuit, or may be a digital signal circuit, so that a process in which the control circuit 407 drives the power switch in the switch circuit 402 is easy to implement.

In a possible implementation, the logical signal is a pulse signal, and the control circuit 407 further includes a delay unit 407E. The delay unit 407E is configured to delay at least one of a rising edge or a falling edge of the pulse in the logical signal by preset duration. The second drive signal generation unit 407D is further configured to generate the second drive signal based on the delayed logical signal and the first drive signal.

In the technical solution, the delay unit 407E in the control circuit 407 may perform delay processing on the logical signal, and may delay a start moment of each pulse in the second drive signal, so that the delay switch is turned on.

In a possible implementation, the fixed frequency is a resonance frequency corresponding to the resonant tank 403.

In the technical solution, the first drive signal is at the resonance frequency corresponding to the resonant tank, and the control circuit 407 may perform a same operation in the start phase and a steady state phase of the LLC converter. In the steady state phase, the current of the resonant tank 403 is less than the current threshold, and the second drive signal generated by the control circuit 407 based on the current of the resonant tank 403 and the first drive signal is the same as the first drive signal.

According to a second aspect, an embodiment of this application provides a control circuit, applied to driving of an inductor-inductor-capacitor LLC converter. The LLC converter includes a switch circuit 402 and a resonant tank 403, and the control circuit includes a current collection unit 407A, a logical signal generation unit 407B, a first drive signal generation unit 407C, and a second drive signal generation unit 407D. The current collection unit 407A is configured to detect a current of the resonant tank 403. The first drive signal generation unit 407C is configured to generate a first drive signal. The first drive signal is a pulse signal having a fixed frequency and a fixed duty cycle. The logical signal generation unit 407B is configured to generate a logical signal. The logical signal is a pulse signal, the current is less than a current threshold in a time period corresponding to a width of a pulse in the logical signal, and the current is greater than or equal to the current threshold within a time interval between two adjacent pulses in the logical signal. The second drive signal generation unit 407D is configured to generate a second drive signal based on the logical signal and the first drive signal. The second drive signal is a second pulse signal, the second drive signal is at a preset level in a time period in which the current is greater than or equal to the current threshold, the second drive signal at the preset level is used to turn off a power switch in the switch circuit 402, and the second drive signal is the same as the first drive signal in a time period in which the current is less than the current threshold.

In a possible implementation, the second drive signal generation unit 407D is specifically configured to perform AND logical operation processing on the logical signal and the first drive signal, to obtain the second drive signal, where a level of the logical signal is a high level in the time period in which the current is less than the current threshold, and the level of the logical signal is a low level in the time period in which the current is greater than or equal to the current threshold.

In a possible implementation, the logical signal is a pulse signal, and the control circuit 407 further includes a delay unit 407E;

the delay unit 407E is configured to delay at least one of a rising edge or a falling edge of the pulse in the logical signal by preset duration; and the second drive signal generation unit 407D is further configured to generate the second drive signal based on the delayed logical signal and the first drive signal.

In a possible implementation, the fixed frequency is a resonance frequency corresponding to the resonant tank 403.

In a possible implementation, the logical signal generation unit 407B includes a comparator, a first input end of the comparator is connected to an output end of the current collection unit 407A, a second input end of the comparator is connected to a fixed level, the fixed level is a level corresponding to the current threshold, and an output end of the comparator is connected to the second drive signal generation power supply 407D or the delay unit 407E.

According to a third aspect, an embodiment of this application provides an inductor-inductor-capacitor LLC converter soft start method. The LLC converter includes a resonant tank and a switch circuit, and the method includes: detecting a current of the resonant tank; generating a second drive signal based on the current and a first drive signal, where the first drive signal is a pulse signal having a fixed frequency and a fixed duty cycle, the second drive signal is a pulse signal, the second drive signal is at a preset level in a time period in which the current is greater than or equal to a current threshold, the second drive signal at the preset level is used to turn off a power switch in the switch circuit, and the second drive signal is the same as the first drive signal in a time period in which the current is less than the current threshold; and outputting the second drive signal to the switch circuit, where the second drive signal is used to drive the power switch in the switch circuit.

In a possible implementation, before the generating a second drive signal based on the current and a first drive signal, the method further includes: generating a logical signal based on the current and the current threshold, where the logical signal is a pulse signal, the current is less than the current threshold in a time period corresponding to a width of a pulse in the logical signal, and the current is greater than or equal to the current threshold within a time interval between two adjacent pulses in the logical signal; and the generating a second drive signal based on the current and a first drive signal includes: performing AND logical operation processing on the logical signal and the first drive signal, to obtain the second drive signal, where a level of the logical signal is a high level in the time period in which the current is less than the current threshold, and the level of the logical signal is a low level in the time period in which the current is greater than or equal to the current threshold.

In a possible implementation, the logical signal is a pulse signal; and before the generating a first drive signal based on the current and a second drive signal, the method further includes: delaying at least one of a rising edge or a falling edge of the pulse in the logical signal by preset duration.

In a possible implementation, the fixed frequency is a resonance frequency corresponding to the resonant tank.

According to a fourth aspect, an embodiment of this application provides an inductor-inductor-capacitor LLC converter control apparatus. The apparatus includes a processor and a memory, the memory is configured to store a program, instructions, or code, and the processor is configured to execute the program, the instructions, or the code in the memory, to complete the method according to any one of the third aspect and the possible designs of the third aspect.

According to a fifth aspect, an embodiment of this application provides an inductor-inductor-capacitor LLC converter control apparatus. The apparatus includes a collection module, a processor, and a memory. The collection module is configured to detect a current of a resonant tank. The memory is configured to store a program, instructions, or code. The processor is configured to execute the program, the instructions, or the code in the memory, to perform the following operations: generating a second drive signal based on the current and a first drive signal, where the first drive signal is a pulse signal having a fixed frequency and a fixed duty cycle, the second drive signal is a pulse signal, the second drive signal is at a preset level in a time period in which the current is greater than or equal to a current threshold, the second drive signal at the preset level is used to turn off a power switch in the switch circuit, and the second drive signal is the same as the first drive signal in a time period in which the current is less than the current threshold; and outputting the second drive signal to the switch circuit, where the second drive signal is used to drive the power switch in the switch circuit.

In a possible implementation, before the generating a second drive signal based on the current and a first drive signal, the processor is further configured to generate a logical signal based on the current and the current threshold. The logical signal is a pulse signal, the current is less than the current threshold in a time period corresponding to a width of a pulse in the logical signal, and the current is greater than or equal to the current threshold within a time interval between two adjacent pulses in the logical signal. When generating a second drive signal based on the current and a first drive signal, the processor is specifically configured to perform AND logical operation processing on the logical signal and the first drive signal, to obtain the second drive signal. A level of the logical signal is a high level in the time period in which the current is less than the current threshold, and the level of the logical signal is a low level in the time period in which the current is greater than or equal to the current threshold.

In a possible implementation, the logical signal is a pulse signal; and before generating the first drive signal based on the current and a second drive signal, the processor is further configured to delay at least one of a rising edge or a falling edge of the pulse in the logical signal by preset duration.

In a possible implementation, the fixed frequency is a resonance frequency corresponding to the resonant tank.

According to a sixth aspect, an embodiment of this application provides a nonvolatile computer-readable storage medium, configured to store a computer program. The computer program is loaded by a processor, to perform the method according to any one of the third aspect and the possible designs of the third aspect.

According to a seventh aspect, an embodiment of this application provides a chip. The chip may be coupled to a memory, and is configured to invoke and execute computer program instructions stored in the memory, so that the method according to any one of the third aspect and the possible designs of the third aspect is performed.

In a possible implementation, the chip includes at least one memory, and the at least one memory stores computer program instructions, so that the chip can perform the method according to any one of the third aspect and the possible designs of the third aspect.

For technical effects that may be achieved in the second aspect and the seventh aspect, refer to descriptions of technical effects that may be achieved in a corresponding design of the first aspect. Details are not described herein again.

DESCRIPTION OF EMBODIMENTS

Usually, an LLC converter includes a resonant inductor, a resonant capacitor, and an excitation inductor, has a good soft switch feature, can greatly reduce a switching loss, and improve energy transmission efficiency, and is one of currently and commonly used power topologies.

When the LLC converter operates in a steady state phase, a frequency of a power switch in the LLC converter is close to an inherent frequency of a resonant tank. A duty cycle of a signal that drives the power switch transistor is close to 50%. However, when the LLC converter operates in a start phase, because a steady-state voltage is not established for an output capacitor of the LLC converter, if a manner of driving each power switch in the start phase is the same as a manner of driving each power switch in the steady state phase, when the LLC converter is in the start phase, a current of the resonant tank is very large, and easily exceeds a current range that can be borne by the power switch, causing damage to the power switch.

Therefore, when the LLC converter is in the start phase, it is of great engineering significance to enable a voltage of the output capacitor to reach an output voltage smoothly and avoid the damage to the power switch.

Figure 1:
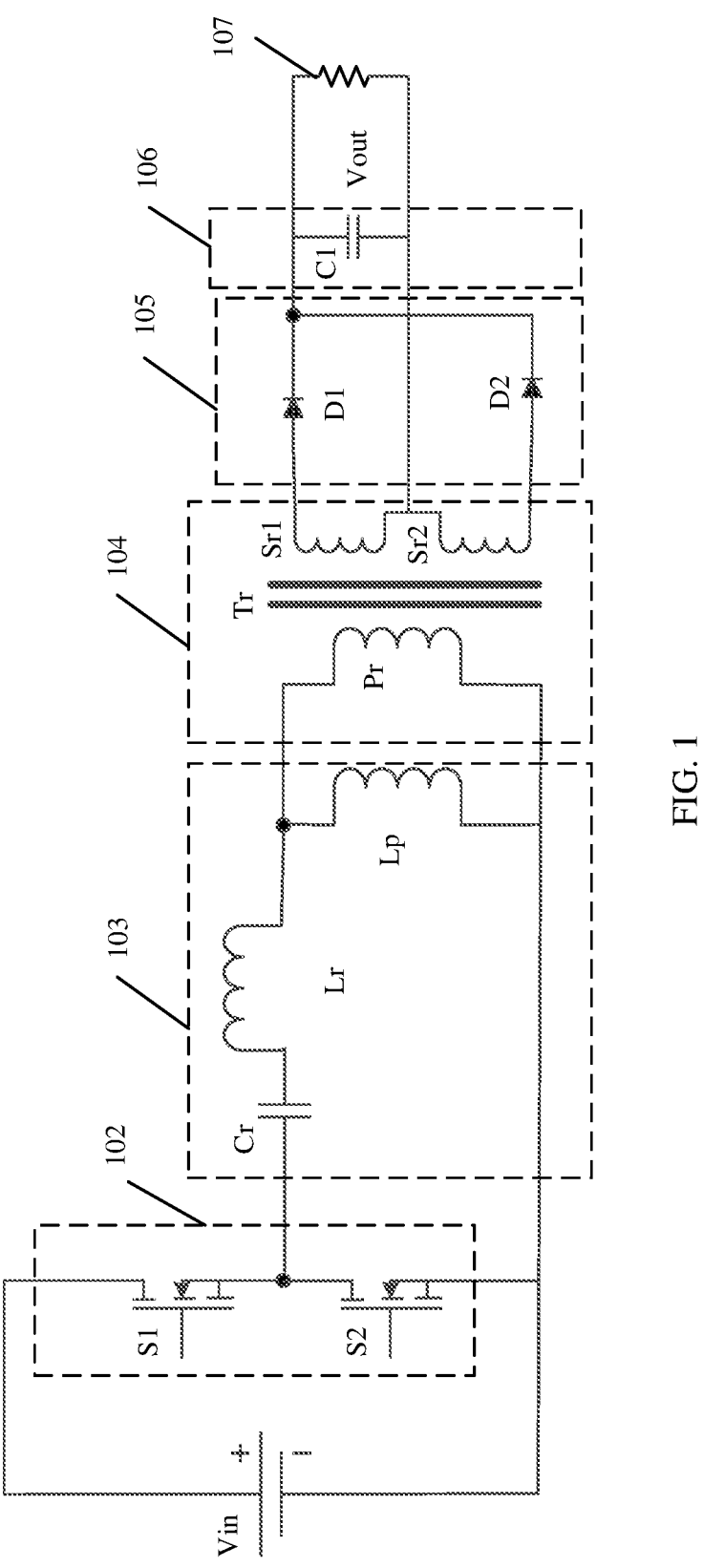
FIG. 1 is a schematic diagram of a circuit structure of an LLC converter.

FIG. 1 shows a circuit structure of an LLC converter. The LLC converter includes an input source Vin, and a switch circuit 102, a resonant tank 103, a conversion circuit 104, a rectifier circuit 105, and an output circuit 106 that are sequentially connected. The switch circuit 102 includes a power switch S1 and a power switch S2 that are connected in series. The power switch S1 and the power switch S2 are connected in series between two electrodes of the input source Vin. The resonant tank 103 includes a resonant capacitor Cr, a resonant inductor Lr, and an excitation inductor Lp that are sequentially connected in series. One end of the resonant capacitor Cr is connected to a connection point between the switch S1 and the switch S2, and the other end of the resonant capacitor Cr is connected to the resonant inductor Lr. One end of the excitation inductor Lp is connected to the resonant inductor Lr, and the other end is connected to a negative electrode of the input source Vin. The conversion circuit 104 includes a primary-side winding Pr, a transformer Tr, and a secondary-side winding Sr that are sequentially coupled. The primary-side winding Pr and the excitation inductor Lp are connected in parallel. The secondary-side winding Sr includes a first winding Sr1 and a second winding Sr2 that are connected in series.

The rectifier circuit 105 includes two diodes, and the two diodes are respectively denoted as a diode D1 and a diode D2. The output circuit 106 includes an output capacitor C1. A cathode of the diode D1 and a cathode of the diode D2 are connected to a first end of the output capacitor C1, and a second end of the output capacitor C1 is connected to a connection point between the first winding Sr1 and the second winding Sr2. An end that is of the first winding Sr1 and that is not connected to the second winding Sr2 is connected to an anode of the diode D1, and an end that is of the second winding Sr2 and that is not connected to the first winding Sr1 is connected to an anode of the diode D2.

A load 107 and the output capacitor C1 are connected in parallel. An output voltage of the output capacitor C1 is denoted as Vout. The LLC converter may convert a voltage provided by the input source Vin into an output voltage Vout, and provide the output voltage Vou for the electrical load 107.

Figure 2:
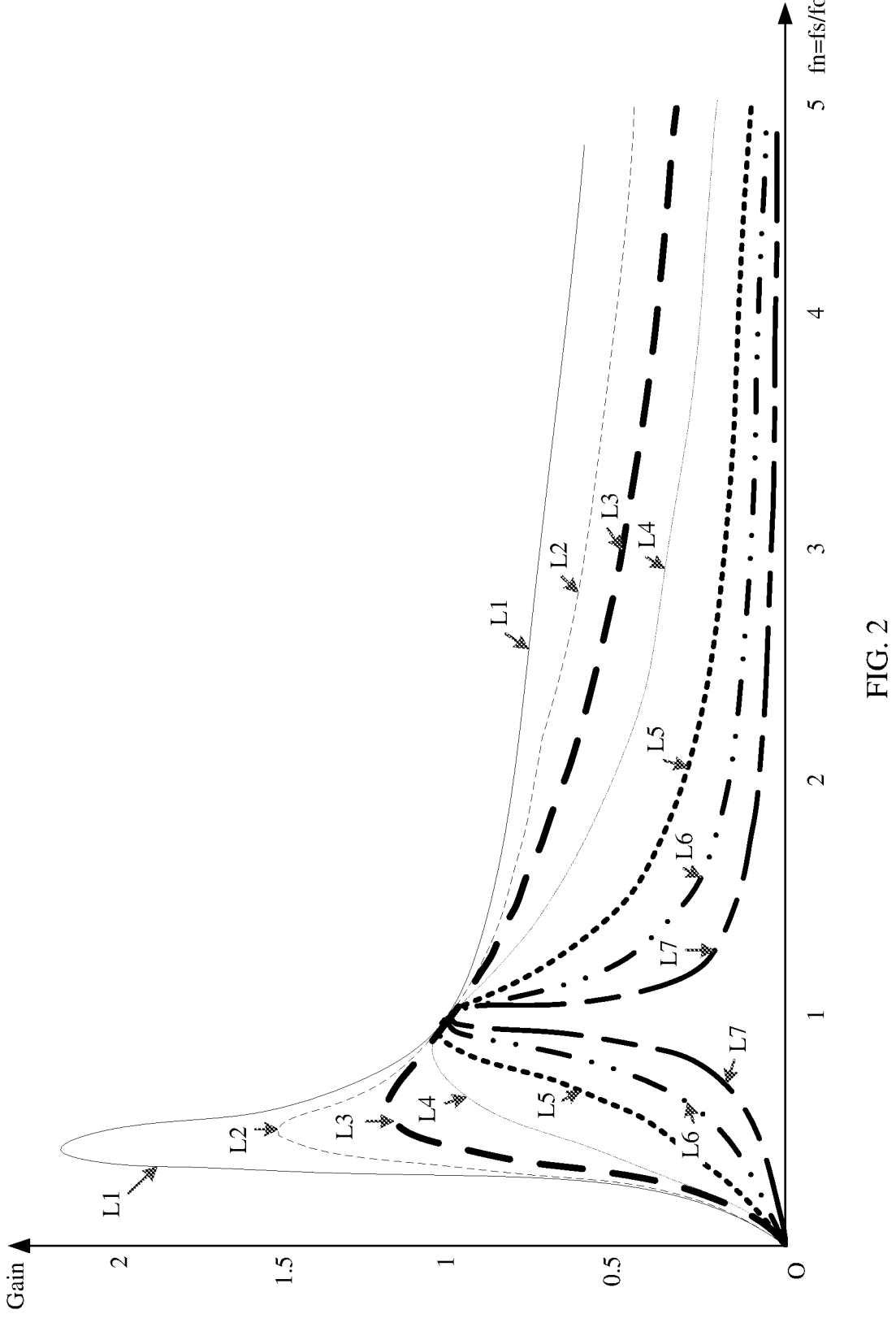
FIG. 2 is a schematic diagram of curves between a switching frequency and a gain of an LLC converter.

Curves that are of LLC converters with different loads and that are between a switching frequency and a gain are shown in FIG. 2. A physical quantity on a horizontal axis represents a ratio (denoted as fn) of a switching frequency fs to a resonance frequency fo, and a physical quantity on a vertical axis represents an output gain. FIG. 2 shows curves of seven loads (as shown in the figure, curves L1 to L7 are respectively curves corresponding to the seven loads). Usually, when fn is close to 1, gains in the curves of all the loads reach the maximum, and the LLC converter may drive each power switch (for example, the power switch S1 and the power switch S2 in FIG. 1) at the switching frequency fo, so that the LLC converter is in a steady state phase. In addition, it can be directly learned from FIG. 2 that a larger value of fn=fs/fo indicates a smaller output gain. Usually, the resonance frequency fo has a fixed value. Therefore, a larger switching frequency fs indicates a smaller output gain.

To avoid damage to a switching transistor, in a related technology, based on this feature, when the LLC converter is in a start phase, a high-frequency drive signal is applied to the power switch S1 and the power switch S2. In other words, a large switching frequency fs is used to control the two power switches. Based on the curves in FIG. 2, a large switching frequency fs corresponds to a very small output gain, so that energy provided by the input source Vin is slowly input to the resonant tank, to limit a current of the resonant tank. After the energy is slowly input to the resonant tank, the energy is slowly input to the output capacitor C1 through an element such as the transformer. As the output voltage Vout of the output capacitor C1 increases, the switching frequency fs is gradually decreased, for example, decreased to the resonance frequency fo, to ensure that an output gain of the output capacitor C1 is maximum, so that the LLC converter ends the start phase and enters the steady state phase.

Figure 3:
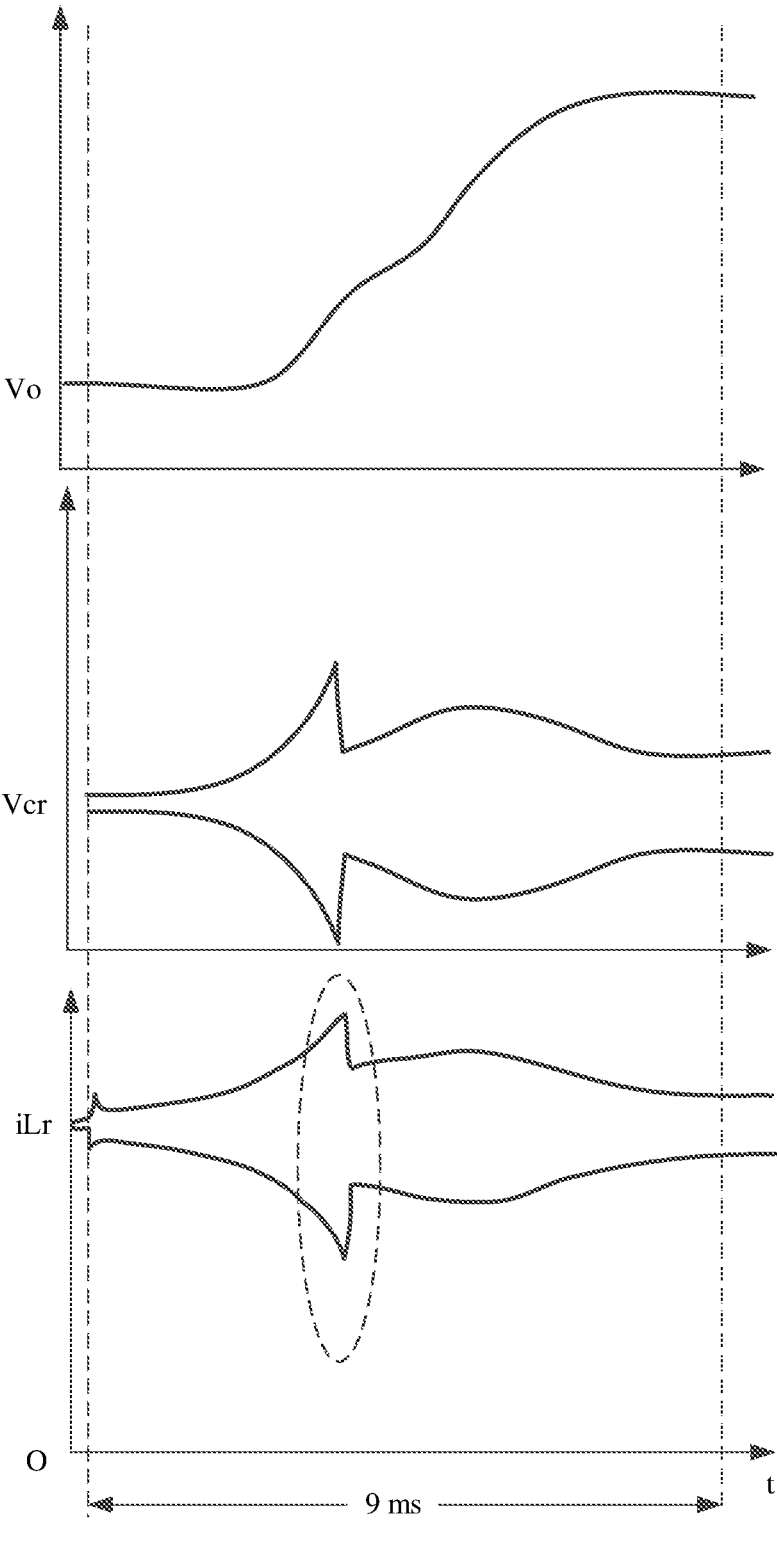
FIG. 3 is a schematic diagram of a current of a resonant tank, a voltage of a resonant capacitor, and a voltage of an output capacitor.

In the start phase of the LLC converter, in a process in which a drive signal with a switching frequency fs=5fo is used to control the power switch and the switching frequency is linearly reduced until the switching frequency is equal to the resonance frequency, a change status of the current iLr of the resonant tank, a change status of a voltage VCr of the resonant capacitor Cr, and a change status of the output voltage Vo of the output capacitor C1 are shown in FIG. 3. The output voltage Vo of the output capacitor C1 slowly increases to a maximum output voltage. However, in this period, a current impulse still occurs in the resonant tank, as shown by an elliptical dashed box in FIG. 3. To avoid the current impulse, the switching frequency fs also needs to be increased. It can be learned that, in the related technology, a higher switching frequency needs to be used in the start phase, to avoid generating an impulse current in the resonant tank. However, if a higher switching frequency is selected in the start phase, duration for increasing the output voltage of the output capacitor C1 to the maximum output voltage becomes longer. In other words, start duration of the LLC converter becomes longer.

To resolve the foregoing problem, embodiments of this application provide an LLC converter, an LLC converter soft start method, an apparatus, and a medium. Embodiments are applied to an LLC converter, to reduce or avoid a current impulse in the resonant tank, shorten start duration, and improve a soft start speed, so as to ensure circuit safety.

Figure 4:
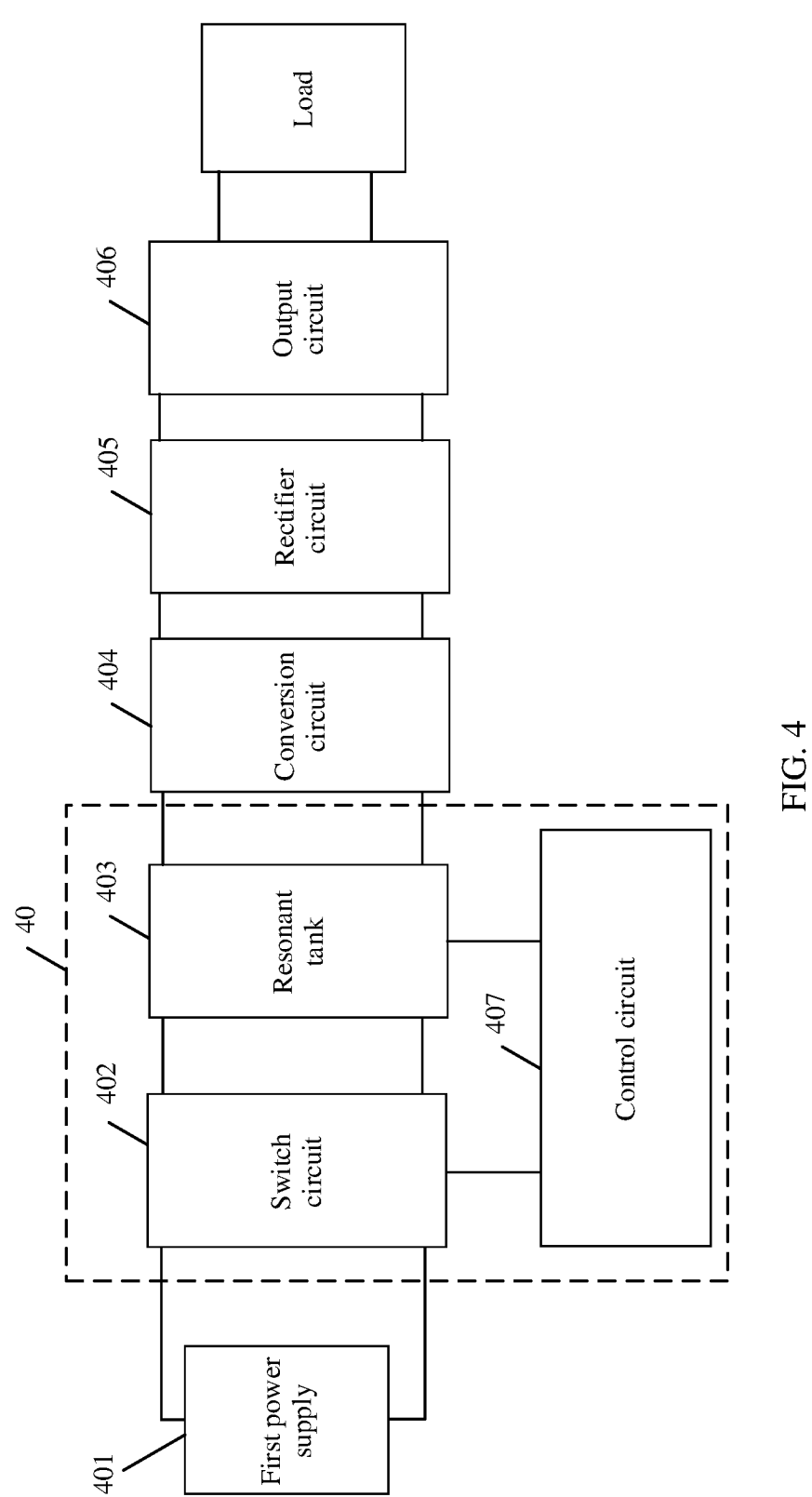
FIG. 4 is a schematic diagram of a structure of an LLC converter.

First, an embodiment of this application provides an LLC converter. As shown in FIG. 4, the LLC converter may include a switch circuit 402, a resonant tank 403, and a control circuit 407. The control circuit 407 is coupled to the switch circuit 402, and the control circuit 407 is coupled to the resonant tank 403. The resonant tank 403 includes at least a resonant capacitor Cr and a resonant inductor Lr that are connected in series. The resonant tank 403 may enable a power switch in the switch circuit 402 to operate in a soft switch state. The LLC converter provided in this embodiment of this application is applied to a wide LLC converter or an LLC circuit.

In a possible design, the LLC converter may further include a conversion circuit 404 connected to the resonant tank 403. The conversion circuit 404 may be configured to perform voltage conversion, current conversion, isolation, voltage stabilization, and the like. The LLC converter may further include a rectifier circuit 405 connected to the conversion circuit 404. The rectifier circuit 405 may be connected to an output circuit 406. The rectifier circuit 405 converts an alternating current provided by the conversion circuit into a direct current, and provides the direct current to the output circuit 406. The output circuit 406 may include an output capacitor, and a load may be connected to the output capacitor in parallel. The LLC converter may convert a first voltage provided by a first power supply 401, and provide, for the load, a second voltage obtained after conversion. It should be understood that, in this embodiment of this application, specific constituent elements of a plurality of parts such as the output circuit 406, the rectifier circuit 405, the conversion circuit 404, the resonant tank 403, the switch circuit 402, and the first power supply 401, and a connection manner between the elements are merely used as an example for description, and do not constitute a specific limitation on the plurality of parts.

The control circuit 407 may detect a current of the resonant tank 403. The control circuit 407 may generate a second drive signal based on the current and a first drive signal, and then output the second drive signal to the switch circuit 402. The second drive signal is used to drive the power switch in the switch circuit 402. The first drive signal may be a pulse signal having a fixed frequency and a fixed duty cycle. The second drive signal is a pulse signal, the second drive signal is at a preset level in a time period in which the current of the resonant tank 403 is greater than or equal to a current threshold, the second drive signal at the preset level is used to turn off the power switch in the switch circuit 402, and the second drive signal is the same as the first drive signal in a time period in which the current of the resonant tank 403 is less than the current threshold in the resonant tank 403.

In this embodiment of this application, the power switch in the switch circuit 402 may be driven by a first-level signal, so that the power switch is in an on state. In other words, the first-level signal may be used to turn on the power switch. The power switch is driven by a second-level signal, so that the power switch is in an off state. In other words, the second-level signal may be used to turn off the power switch. In an example, the first level may be a high level, and the second level may be a low level. In other words, a high-level signal may drive the power switch to be in the on state, and a low-level signal may drive the power switch to be in an open-circuit (off) state. In another example, the first level may be a low level, and the second level may be a high level. In other words, a low-level signal may drive the switch to be in the on state, and the high-level signal may drive the power switch to be in an open-circuit state. The following provides descriptions by using an example in which the first-level signal is at a high level and may be used to drive the power switch to be in the on state, and the second-level signal is at a low level and may be used to drive the power switch to be in the off state. In other words, an example in which the preset level is the second level is used for description.

The control circuit 407 may generate, based on a case of the first drive signal and whether the current of the resonant tank 403 exceeds the current threshold, the second drive signal used to drive the power switch in the switch circuit 402. In the time period in which the current of the resonant tank 403 is greater than or equal to the current threshold, in other words, when an overcurrent occurs in the resonant tank 403, the second drive signal is at the second level and may drive the power switch to be turned off, to avoid generating a current impulse in the resonant tank 403 and protect an element in the LLC converter. In the time period in which the current of the resonant tank 403 is less than the current threshold, the second drive signal may be the same as the first drive signal. In other words, if the first drive signal is at the second level, the second drive signal is also at the second level; or if the first drive signal is at the first level, the second drive signal is also at the first level.

In other words, the control circuit 407 may generate the second drive signal at the first level based on a case in which the first drive signal is at the first level and the current of the resonant tank 403 is less than the current threshold. The control circuit 407 may generate the second drive signal at the second level based on a case in which the first drive signal is at the first level, and the current of the resonant tank 403 is greater than or equal to the current threshold. The control circuit 407 may generate the second drive signal at the second level based on a case in which the first drive signal is at the second level. It can be learned that the second drive signal is a pulse signal, and in a time period corresponding to a width of a pulse, an amplitude of the pulse may be the first level in a time period in which the current is less than the current threshold, and the second drive signal is at a low level in a time period in which the current is greater than or equal to the current threshold.

In this embodiment of this application, the control circuit 407 may perform the foregoing operation for both a driving manner in the start phase of the LLC converter and a driving manner in the steady state phase of the LLC converter.

In an example, the control circuit 407 may generate the first drive signal based on a fixed frequency and a fixed duty cycle, so that the first drive signal is a pulse signal having the fixed frequency and the fixed duty cycle, the amplitude of the pulse is the first level, and a level between two adjacent pulses is the second level. The first drive signal may be used to drive the power switch in the switch circuit 402 in the steady state phase. The switch circuit 402 may include a plurality of power switches, and the control circuit 407 may generate a first drive signal corresponding to each switch. Each switch corresponds to a different first drive signal. For example, the first drive signal corresponding to each switch has a different turn-on moment, or the first drive signal corresponding to each switch is out-of-phase. Optionally, the fixed frequency corresponding to the first drive signal may be a resonance frequency corresponding to the resonant tank 403. If the switch circuit 402 includes two switches connected in series, the duty cycle of the first drive signal may be 50%.

In a possible implementation, if the current of the resonant tank 403 is less than or equal to the current threshold, the control circuit 407 may apply the first drive signal to the switch circuit 402. If the current of the resonant tank 403 is greater than the current threshold, the control circuit 407 may generate the second drive signal based on the current of the resonant tank 403 and the first drive signal. In a time period corresponding to a width of a first-level pulse in the second drive signal, the current of the resonant tank 403 is less than the current threshold, and a level of the first drive signal is the first level. In a time period corresponding to a width of a second-level pulse in the second drive signal, the current of the resonant tank 403 is greater than or equal to the current threshold, or a level of the first drive signal is the second level. The control circuit 407 may be implemented in a plurality of manners or by using a plurality of circuits, to generate the second drive signal having the foregoing characteristics.

In this embodiment of this application, based on a case in which the level of the second drive signal is the second level in the corresponding time period in which the current of the resonant tank 403 is greater than or equal to the current threshold, the control circuit 407 may enable the switch to be in an off state. In this design, on duration of a switch in the switch circuit 402 is short, to reduce currents flowing into the resonant tank 403, avoid generating a current impulse in the resonant tank 403, and protect the element in the LLC converter. The control circuit 407 may generate, based on a case in which the current of the resonant tank 403 is less than the current threshold, a second drive signal whose level is the same as the level of the first drive signal. For example, if the level of the first drive signal is the first level and the current of the resonant tank 403 is less than the current threshold, the second drive signal generated by the control circuit 407 is at the first level, and the second drive signal is applied to the switch circuit 402, so that the on duration of the switch in the switch circuit 402 is long, and the output circuit 406 can quickly establish an output voltage, to shorten start duration of the LLC converter, and improve a start speed.

Figure 5:
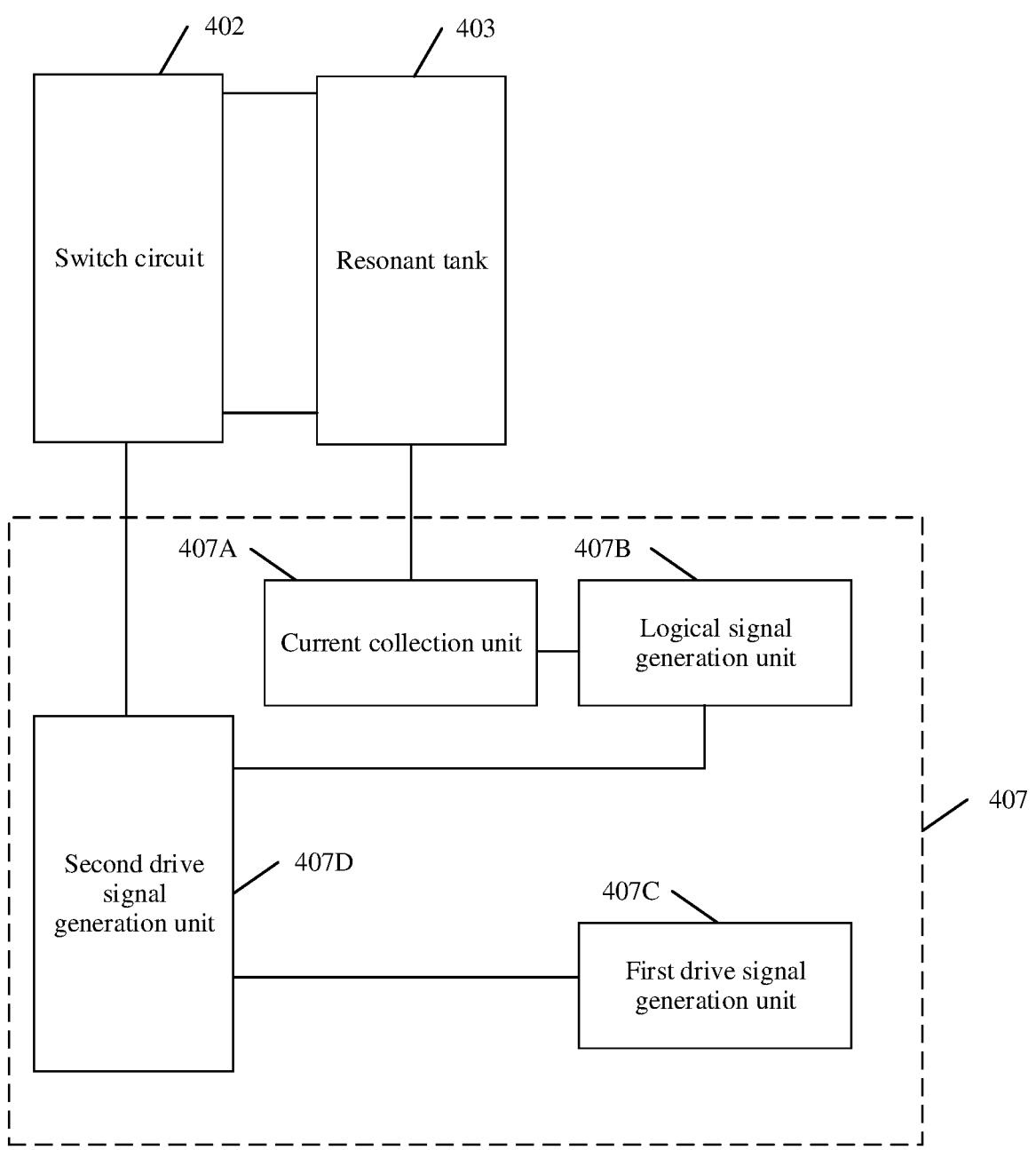
FIG. 5 is a schematic diagram of a structure of an LLC converter.

In a possible implementation, as shown in FIG. 5, the control circuit 407 may include a current collection unit 407A, a logical signal generation unit 407B, a first drive signal generation unit 407C, and a second drive signal generation unit 407D. The current collection unit 407A is coupled to the resonant tank 403, and the current collection unit 407A may collect the current iLr of the resonant tank 403, and transmit the collected current to the logical signal generation unit 407B. In this embodiment of this application, the current collection unit 407A may collect the current iLr of the resonant tank 403 in real time.

The logical signal generation unit 407B may generate a logical signal Sr based on the current threshold Imax and the current iLr of the resonant tank 407B, and transmit generated logical signal Sr to the second drive signal generation unit 407D.

In an example, the logical signal generation unit 407B may perform overcurrent detection on the current iLr of the resonant tank 403. If the current iLr is greater than the current threshold Imax, a signal whose amplitude is a third voltage is generated. If the current iLr is less than or equal to the current threshold Imax, a signal whose amplitude is a fourth voltage is generated. Optionally, the third voltage is at a low level, and the fourth voltage is at a high level. In this embodiment of this application, the low level may be represented by 0, and the high level may be represented by 1. It can be learned that the signal generated by the logical signal generation unit 407B is a pulse signal, the current of the resonant tank 403 is less than the current threshold in a time period corresponding to a width of a pulse in the signal, and the current of the resonant tank 403 is greater than or equal to the current threshold within a time interval between two adjacent pulses.

The current collection unit 407A may collect the current iLr of the resonant tank 403 in real time, and transmit the current iLr to the logical signal generation unit 407B. In this way, the logical signal generation unit 407B may also perform overcurrent detection on the current iLr in real time, and generate a logical signal that can represent whether an overcurrent occurs.

If continuous duration in which iLr is greater than the current threshold Imax is first duration, the logical signal generated by the logical signal generation unit 407B may be a signal whose amplitude is the third voltage, and duration of the signal is the first duration. If continuous duration in which the current iLr is less than or equal to the current threshold Imax is second duration, the logical signal generated by the logical signal generation unit 407B may be a signal whose amplitude is the fourth voltage, and duration of the signal is the second duration. Optionally, the third voltage may be 0, the fourth voltage may be 1, and the signal generated by the logical signal generation unit 407B may be considered as a logical signal.

The first drive signal generation unit 407C may generate the first drive signal S1 (a drive signal of each switch in the steady state phase of the LLC converter), and provide the first drive signal S1 for the second drive signal generation unit 407D. Optionally, a switching frequency fs corresponding to the first drive signal S1 may be equal to a resonance frequency fo. The first drive signal generation unit 407C may generate a first drive signal corresponding to each switch in the switch circuit 402.

The first drive signal S1 generated by the first drive signal generation unit 407C may be a signal used to drive each switch in the steady state phase of the LLC converter. Usually, the first drive signal generation unit 407C may generate, based on the preset switching frequency fs and the preset duty cycle, the drive signal corresponding to each switch. For example, the preset switching frequency fs may be the same as the resonance frequency fo. For example, the switching frequency fs may be 10 Hz. If the switch circuit 402 includes two switches, the preset duty cycle may be 50%.

It should be understood that the first drive signal generated by the first drive signal generation unit 407C is a signal having the fixed frequency and the fixed duty cycle, and may be used to drive the switch in the switch circuit 402 in the steady state phase. In the steady state phase of the LLC converter, the control circuit 407 may transmit the first drive signal generated by the first drive signal generation unit 407C to the switch circuit 402, to drive the switch, or may transmit the second drive signal generated by the second drive signal generation unit 407D to the switch circuit 402, to drive the switch.

The second drive signal generation unit 407D may generate the second drive signal S2 based on the logical signal Sr and the first drive signal S1. Then, the second drive signal S2 is sent to each switch in the switch circuit 402, to drive each switch.

In a possible implementation, the second drive signal generation unit 407D may have an AND (AND) logical operation function. The second drive signal generation unit 407D may include a logic gate circuit, for example, an AND gate circuit, or referred to as an AND logic gate circuit. The AND logic gate circuit may implement an AND logic function in digital logic. If a maximum of one high level is input to the AND logic gate circuit, the AND logic gate circuit outputs a low level. In this embodiment of this application, a signal input to the AND logic gate circuit may also be considered as a signal received by the AND logic gate circuit.

For example, 1 indicates a high level, and 0 indicates a low level. If the signal input to the AND logic gate circuit is 1, a signal output by the AND logic gate circuit is 1. If the signal input to the AND logic gate circuit is 0 and 1, a signal output by the AND logic gate circuit is 0. If the signal input to the AND logic gate circuit is 0, a signal output by the AND logic gate circuit is 0.

When an amplitude of the logical signal Sr generated by the logical signal generation unit 407B is a low level, in other words, when the current of the resonant tank 403 is greater than or equal to the current threshold Imax, it may reflect that the current of the resonant tank 403 is too large, and an impulse may be caused to the switch in the switch circuit 402. The second drive signal generation unit 407D may use, as the second drive signal S2, a result of performing an AND (AND) logical operation on the logical signal Sr whose amplitude is a low level and the first drive signal S1. That is, the second drive signal S2 is a signal whose amplitude is a low level.

In a possible implementation, when the first drive signal generation unit 407C generates the first drive signal S1 used to drive the switch to be in the on state (that is, a level of the first drive signal S1 is a high level), if the logical signal Sr generated by the logical signal generation unit 407B is a low-level signal, the second drive signal generation unit 407D may generate a second drive signal S2 whose level is a low level. For example, the second drive signal generation unit 407D may perform an AND (AND) logical operation on the drive signal S2 generated by the first drive signal generation unit 407C and the logical signal Sr generated by the logical signal generation unit 407B, to obtain the second drive signal S2.

In a possible implementation, the switch circuit 402 includes a plurality of switches, and the second drive signal generation unit 407D may include AND logic gate circuits whose quantity is the same as a quantity of the plurality of switches. The plurality of switches and a plurality of AND logic gate circuits may be in a one-to-one correspondence. Each AND logic gate circuit may receive the logical signal Sr generated by the logical signal generation unit 407B and a first drive signal S1 that corresponds to a switch and that is generated by the first drive signal generation unit 407C, and generate, based on the two received signals, a second drive signal S2 corresponding to a switch.

When the first drive signal S1 generated by the first drive signal generation unit 407C is used to drive the switch to be in an open-circuit state (that is, a level of the second drive signal S2 is a low level), the second drive signal generation unit 407D may not adjust the first drive signal S1 generated by the first drive signal generation unit 407C, or the second drive signal generation unit 407D may stop generating the second drive signal S2.

Alternatively, the second drive signal S2 generated by the second drive signal generation unit 407D may be the same as the first drive signal S1. In other words, the generated second drive signal S2 is at a low level, and may be used to drive the switch to be in an open-circuit state.

Alternatively, the second drive signal generation unit 407D may use, as the second drive signal S2, a result of performing an AND (AND) logical operation on the logical signal Sr and the low-level first drive signal S1. In other words, an amplitude of the generated second drive signal S2 is a low level.

In this embodiment of this application, the second drive signal generation unit 407D may generate the second drive signal S2 based on the logical signal Sr provided by the logical signal generation unit 407B in real time and the first drive signal S1 provided by the first drive signal generation unit 407C in real time, and transmit the generated second drive signal S2 to the switch in the switch circuit 402, to drive the switch.

For example, the second drive signal generation unit 407D may use, as the second drive signal S2, a result of performing an AND (AND) logical operation on the logical signal Sr and the first drive signal S1. The control circuit 407 may detect the current of the resonant tank 403, and adjust, based on whether the current is greater than the current threshold, a drive signal applied to the switch circuit 402, to flexibly adjust the drive signal based on a case of the current of the resonant tank 403, avoid generating a current impulse in the resonant tank 403 in a closed-loop control manner, and ensure the element in the LLC converter.

In this embodiment of this application, the second drive signal generation unit 407D generates a low-level second drive signal S2 based on a low-level logical signal Sr and a high-level first drive signal S1, to drive the switch, so as to shorten continuous on duration of the switch. In such a design, when the current of the resonant tank 403 is too large, the control circuit 407 may adjust a driving manner of the switch circuit 402 from a manner of applying a drive signal having a fixed frequency and a fixed duty cycle to a manner of applying a drive signal that has a non-fixed frequency and a non-fixed duty cycle and that is generated based on continuous duration in which the current of the resonant tank 403 is greater than the current threshold.

Figure 6:
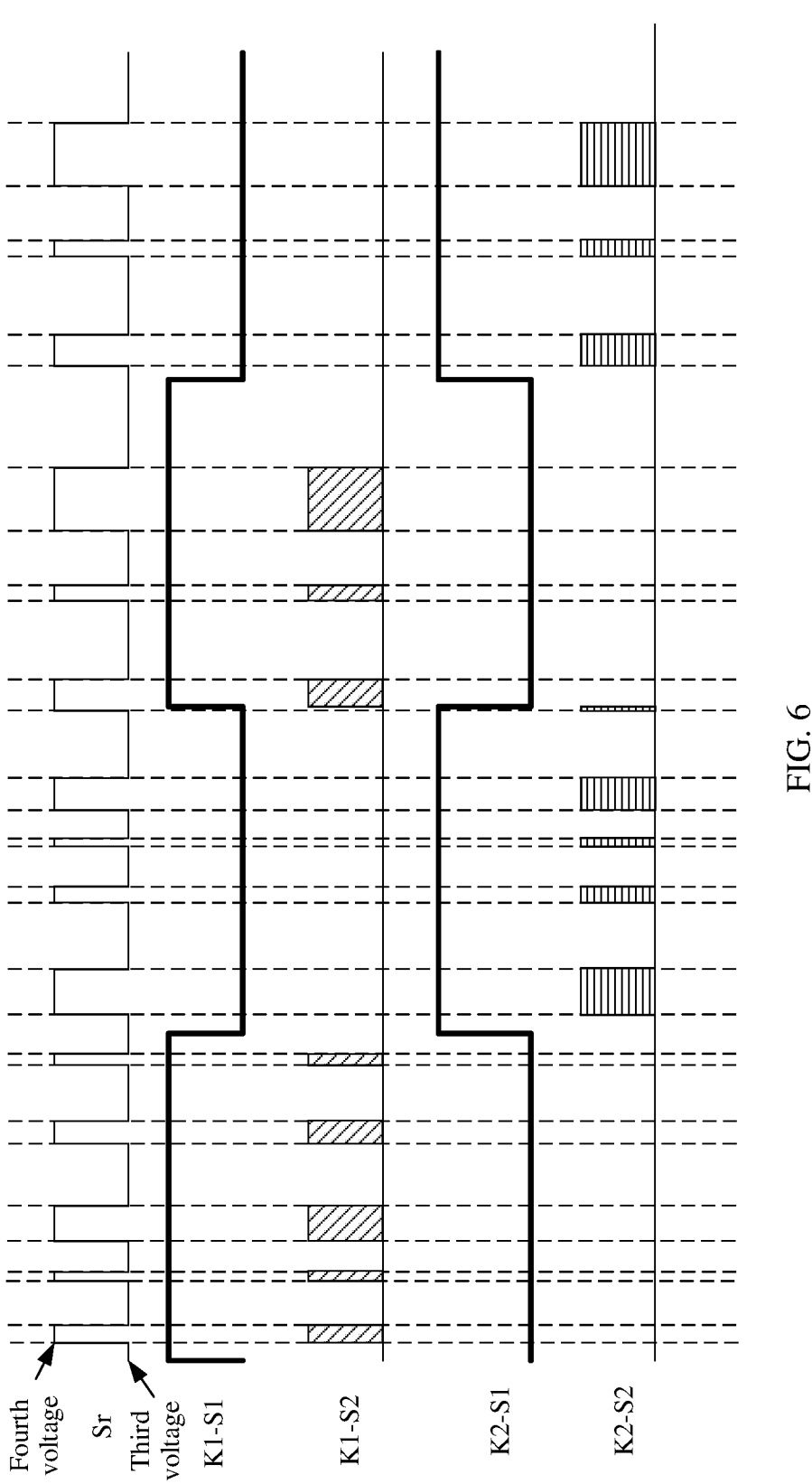
FIG. 6 is a schematic diagram of a drive signal of a switch.

The following provides descriptions by using an example in which the switch circuit 402 includes two switches. The two switches may be respectively denoted as a switch K1 and a switch K2. As shown in FIG. 6, a first drive signal that corresponds to a switch K1 and that is generated by the first drive signal generation unit 407C is denoted as K1-S1, and a first drive signal that corresponds to a switch K2 and that is generated by the first drive signal generation unit 407C is denoted as K2-S1. A duty cycle of the switch K1 and a duty cycle of the switch K2 are 50%. The two switches may be driven by a high level to be in an on state, and is driven by a low level to be in an open-circuit state.

In the logical signal Sr generated by the logical signal generation unit 407B, a low level corresponds to the third voltage, and a high level corresponds to the fourth voltage. The logical signal Sr may include a signal whose amplitude is the third voltage and a continuous signal whose amplitude is the fourth voltage.

The switch K1 is used as an example. When a logical AND (AND) logical operation is performed on the first drive signal K1-S1 of the switch K1 and the logical signal Sr, a second drive signal K1-S2 of the switch K1 may be obtained, as shown in a waveform in a third row in FIG. 6. In the second drive signal K1-S2, an amplitude of a waveform marked with a slash is a high level, and the signal may drive the switch K1 to be in an on state. A signal between two waveforms marked with a slash is at a low level, and the signal may drive the switch K1 to be in an open-circuit state.

A signal in a first half period in a driving period of the switch K1 is a high-level signal, and may enable the switch K1 to be in an on state. In other words, the first half period in the driving period is an on period. Therefore, a second half period in the driving period is an open-circuit period (or an off period).

It can be learned from FIG. 6 that the second drive signal K1-S2 in the second half period in the driving period is at a low level, so that the switch K1 is in an open-circuit state. In the first half period in the driving period, if there are a plurality of cases in which the current of the resonant tank 403 is greater than the current threshold, the logical signal Sr generated by the logical signal generation unit 407B may include a plurality of signals whose amplitudes are a third level and a plurality of signals whose amplitudes are a fourth level. In the first half period in the driving period, the logical signal generation unit 407B may perform an AND (AND) logical operation on a low-level logical signal Sr and a high-level first drive signal K1-S1, and then generate a low-level second drive signal K1-S2, so that when an overcurrent occurs in the resonant tank 403, the switch in the switch circuit is turned off, to avoid generating a current impulse in the resonant tank 403. The logical signal generation unit 407B may perform an AND (AND) logical operation on a high-level logical signal Sr and a high-level first drive signal K1-S1, and generate a high-level second drive signal K1-S2, to turn on the switch in the switch circuit when no overcurrent occurs in the resonant tank 403.

In this embodiment of this application, the driving period of the switch K1 is used as a reference to describe a relationship between the logical signal Sr, the first drive signal K1-S1, and the second drive signal K1-S2, and constitutes no limitation on a processing period of the second drive signal generation unit 407D. The second drive signal generation unit 407D may perform an AND (AND) logical operation on the logical signal Sr and the first drive signal K1-S1 in real time, and generate the second drive signal K1-S2.

Figure 7:
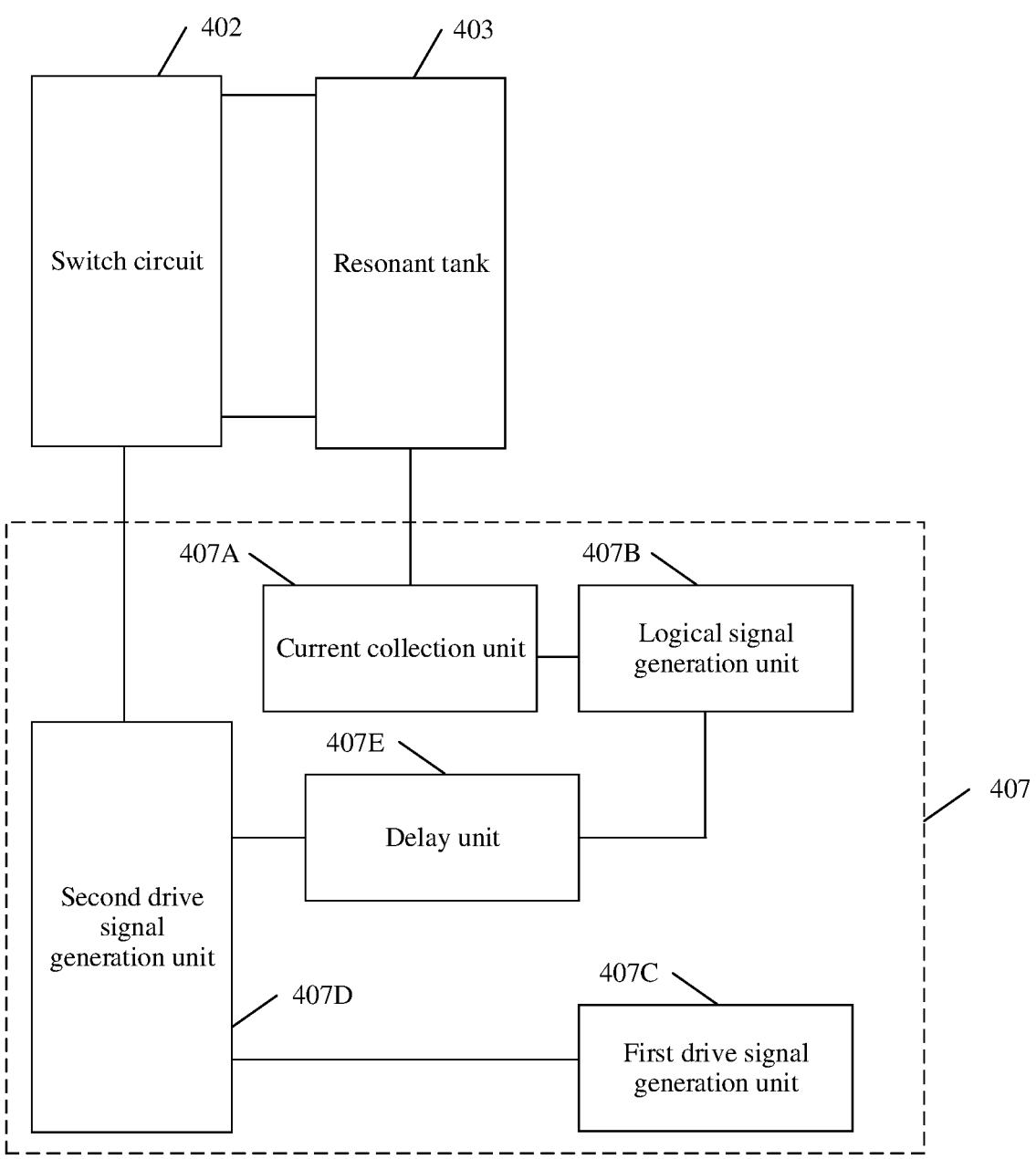
FIG. 7 is a schematic diagram of a structure of an LLC converter.

In a possible implementation, the control circuit 407 may further include a delay unit 407E. As shown in FIG. 7, the delay unit 407E may be connected between the logical signal generation unit 407B and the second drive signal generation unit 407D. The delay unit 407E is configured to generate a delayed logical signal Sdr based on the logical signal Sr generated by the logical signal generation unit 407B. The delay unit 407E provides the generated delayed logical signal Sdr for the second drive signal generation unit 407D. The second drive signal generation unit 407D may generate the second drive signal S2 based on the delayed logical signal Sdr and the first drive signal S1 generated by the first drive signal generation unit 407C.

In this embodiment of this application, the delay unit 407E may perform delay processing on the logical signal Sr generated by the logical signal generation unit 407B.

Figure 8:
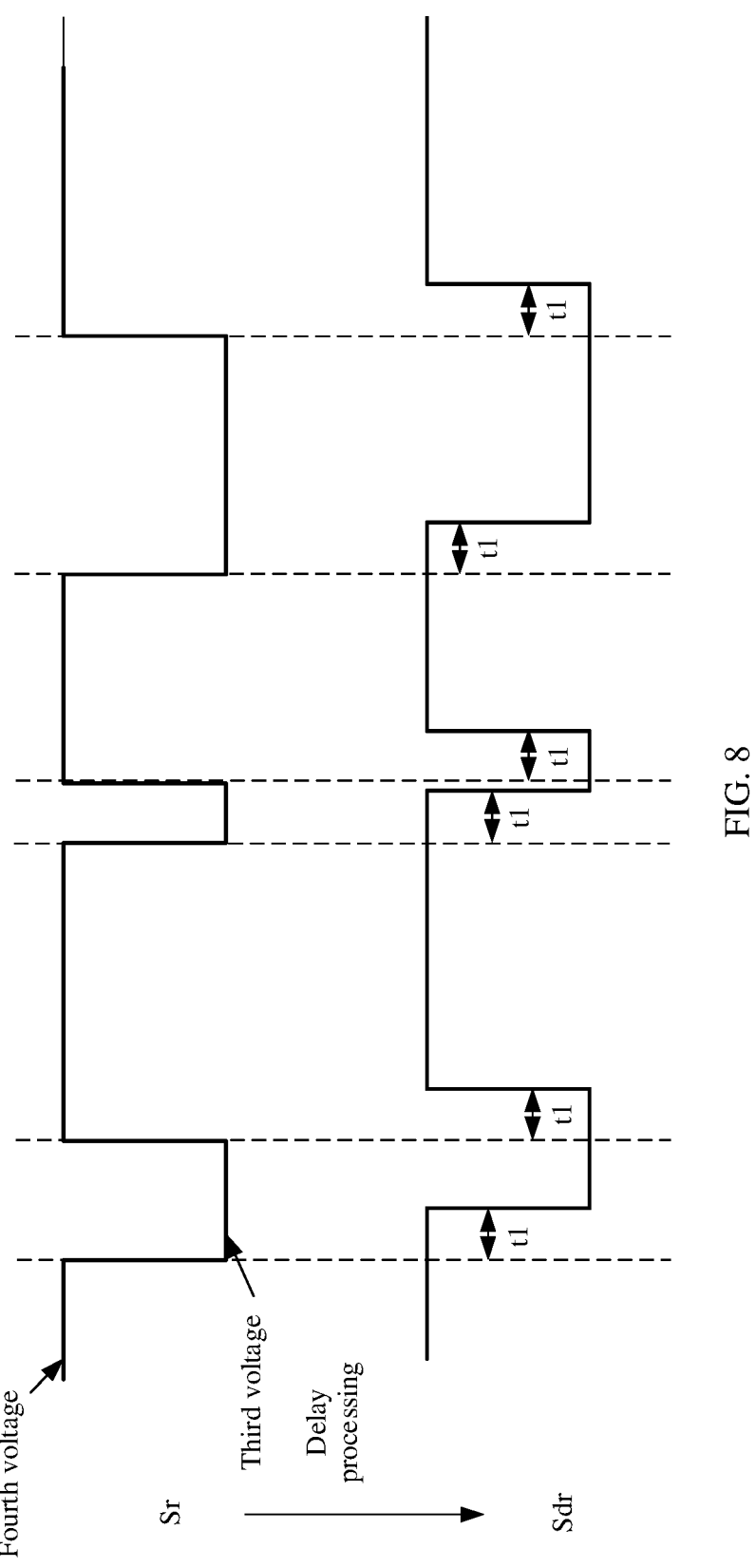
FIG. 8 is a schematic diagram of a delay processing process.

In an example, when the delay unit 407E may perform delay processing on the logical signal Sr, after receiving the logical signal Sr, the delay unit 407E may provide the received logical signal Sr for the second drive signal generation unit 407D after first delay duration t1, as shown in FIG. 8. For ease of distinguishing, in this embodiment of this application, a signal sent by the delay unit 407E to a signal adjustment unit 407 is denoted as a delayed logical signal Sdr.

The second drive signal generation unit 407D generates the second drive signal S2 based on the delayed logical signal Sdr and the first drive signal S1 generated by the first drive signal generation unit 407C. Optionally, the signal adjustment unit 407 may perform an AND (AND) logical operation on the delayed logical signal Sdr and the drive signal S1, to obtain a second drive signal S2*.

Figure 9:
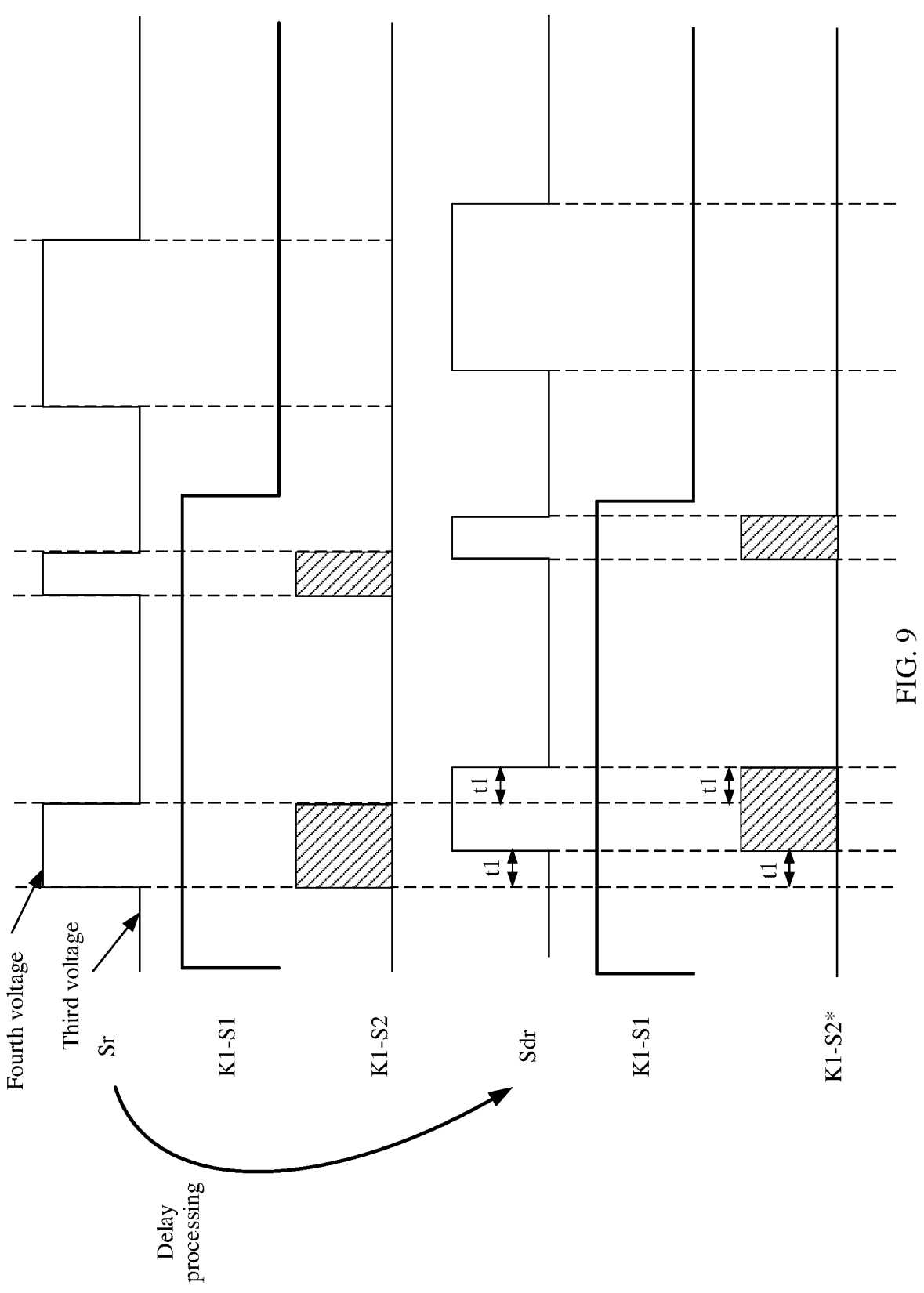
FIG. 9 is a schematic diagram of a drive signal of a switch.

As shown in FIG. 9, an example in which a second drive signal of the switch K1 is generated is used. The delay unit 407E adjusts, based on the logical signal Sr, the first drive signal S1 generated by the first drive signal generation unit 407C, and generates the second drive signal K1-S2. The second drive signal generation unit 407D adjusts, based on the delayed logical signal Sdr, the first drive signal S1 generated by the first drive signal generation unit 407C, and generates a second drive signal K1-S2*.

In a corresponding time period (a time period corresponding to a high-level signal) in which the first drive signal K1-S1 generated by the first drive signal generation unit 407C is used to drive the switch K1 to be in an on state, that is, in a time period in which the first drive signal K1-S1 in FIG. 9 is at a high level, because the delayed logical signal Sdr is delayed for first delay duration t1, a turn-on moment of each switch is delayed by the first delay duration t1. Compared with a start moment at which the switch is in an on state in the first drive signal K1-S1, a start moment at which the switch is in an on state in the second drive signal K1-S2* is also delayed by the first delay duration t1.

In this embodiment of this application, the delayed logical signal Sdr is a signal generated by delaying the logical signal Sr for the first delay duration t1. Therefore, in the second drive signal S2 generated by the second drive signal generation unit 407D, a start moment of a high-level signal is delayed, and a turn-on moment of each switch may be delayed. The turn-on moment of each switch is delayed, to delay a moment at which a first power supply 401 provides energy, and reduce energy entering the resonant tank 403, so that the current of the resonant tank 403 is reduced.

Figure 10:
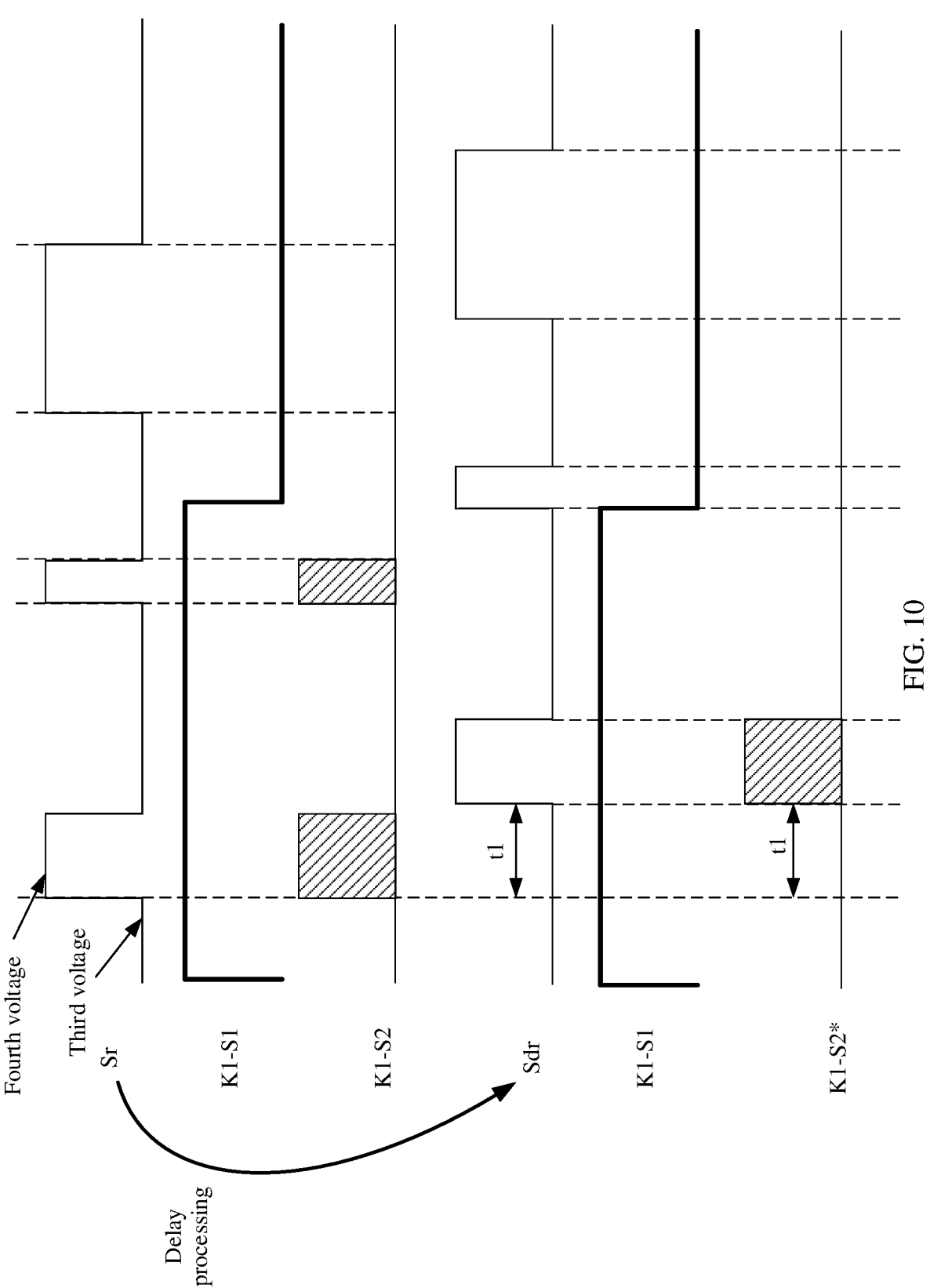
FIG. 10 is a schematic diagram of a drive signal of a switch.

In a possible case, a high level in the second drive signal S2 generated by the second drive signal generation unit 407D based on the delayed logical signal Sdr and the first drive signal S1 generated by the first drive signal generation unit 407C corresponds to shorter total duration, to further reduce an on time period of each switch. As shown in FIG. 10, after the delay unit 407E performs delay processing on the logical signal Sr, a part that is of a low-level logical signal Sr and that falls in a time period corresponding to a high-level signal in the first drive signal K1-S1 is reduced. Therefore, after the second drive signal generation unit 407D performs an AND (AND) logical operation on the delayed logical signal Sdr and the first drive signal K1-S1 generated by the first drive signal generation unit 407C, in the generated second drive signal K1-S2*, duration of a high-level signal is reduced, duration in which the switch K1 is on is shortened, and duration in which the switch K1 is off is increased.

In this embodiment of this application, the logical signal Sr may include a pulse signal. When performing delay processing on the logical signal Sr to generate the delayed logical signal Sdr, the delay unit 407E may delay at least one of a rising edge or a falling edge of a pulse in the logical signal by preset duration. In this embodiment of this application, a delay processing process of the rising edge of the pulse signal may be independent of a delay processing process of the falling edge of the pulse signal. For example, the delay unit 407E may delay a rising edge of the pulse signal in the logical signal Sr by the first delay duration t1, to generate the delayed logical signal Sdr. The delay unit 407E may further delay a falling edge of the pulse signal in the logical signal Sr by the second delay duration t2, to generate the delayed logical signal Sdr.

Figure 11:
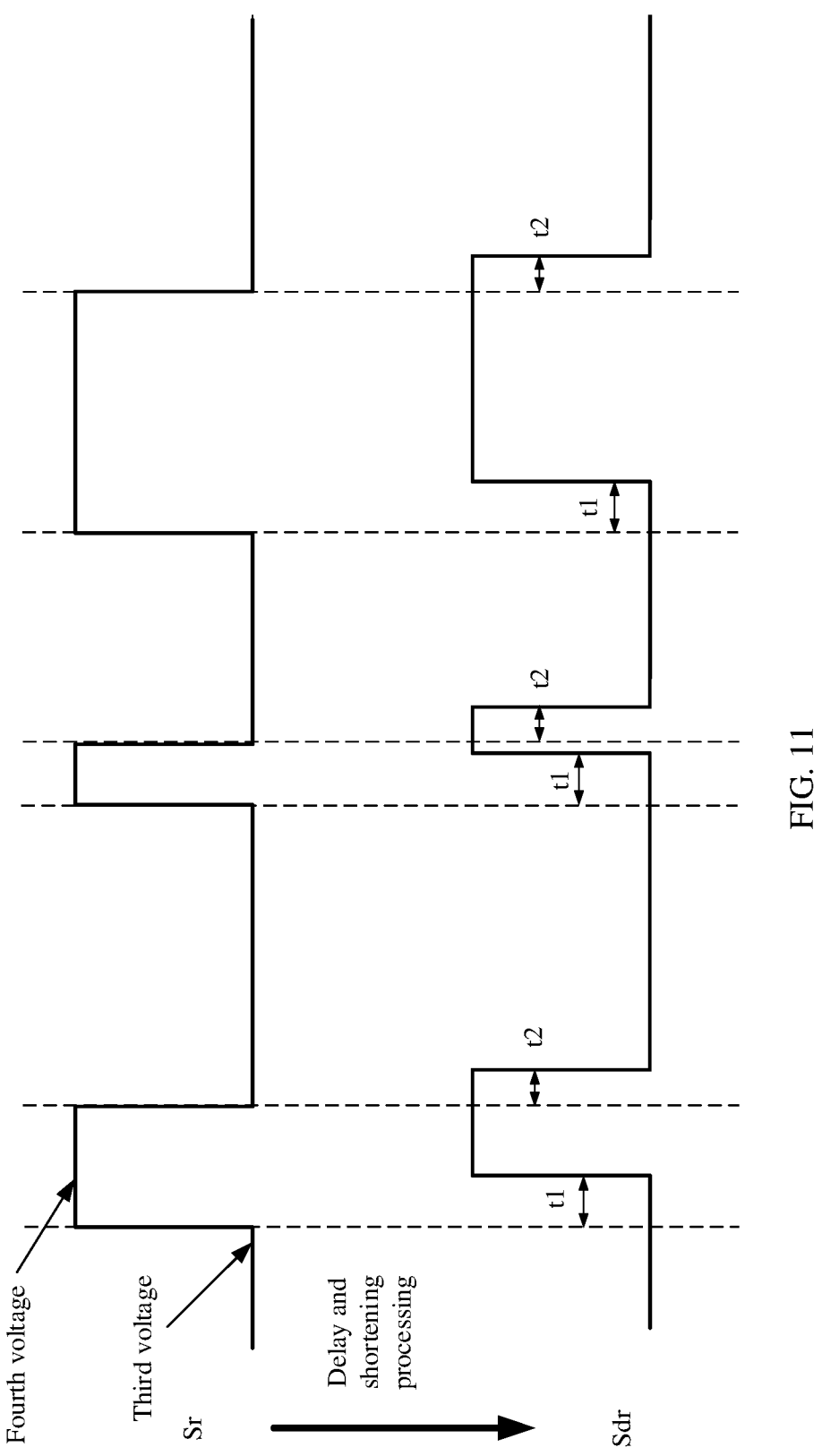
FIG. 11 is a schematic diagram of a delay processing process.

The delay unit 407E may further delay the rising edge of the pulse signal in the logical signal Sr by the first delay duration t1, and delay the falling edge by the second delay duration t2. In an example, as shown in FIG. 11, the delay unit 407E may delay, by the first delay duration t1, a rising edge of a signal Sr whose amplitude is the third voltage, and delay, by the second delay duration t2, a falling edge of the logical signal Sr. Continuous duration of the signal Sr whose amplitude is the third voltage is d1. Optionally, if t2 is less than t1, duration by which the falling edge is delayed is greater than duration by which the rising edge is delayed, continuous duration of a low-level signal becomes larger, continuous duration d2 of the delayed logical signal Sdr generated by the delay unit 407E may be greater than continuous duration d1 of the signal Sr whose amplitude is the third voltage, and a duration increment is $\Delta t = t1 - t2$.

In an actual scenario, a signal whose amplitude is the fourth voltage is between two signals whose amplitudes are the third voltage. In an operation that the delay unit 407E increases continuous duration of a logical signal whose amplitude is the third voltage, continuous duration of a logical signal whose amplitude is the fourth voltage is reduced.

In this embodiment of this application, the signal adjustment unit 407 may perform an AND (AND) logical operation on the delayed logical signal Sdr and the first drive signal S1, to obtain the second drive signal S2, so that a turn-on moment of each switch is delayed by the first delay duration t1, and an on duration is further reduced.

Figure 12:
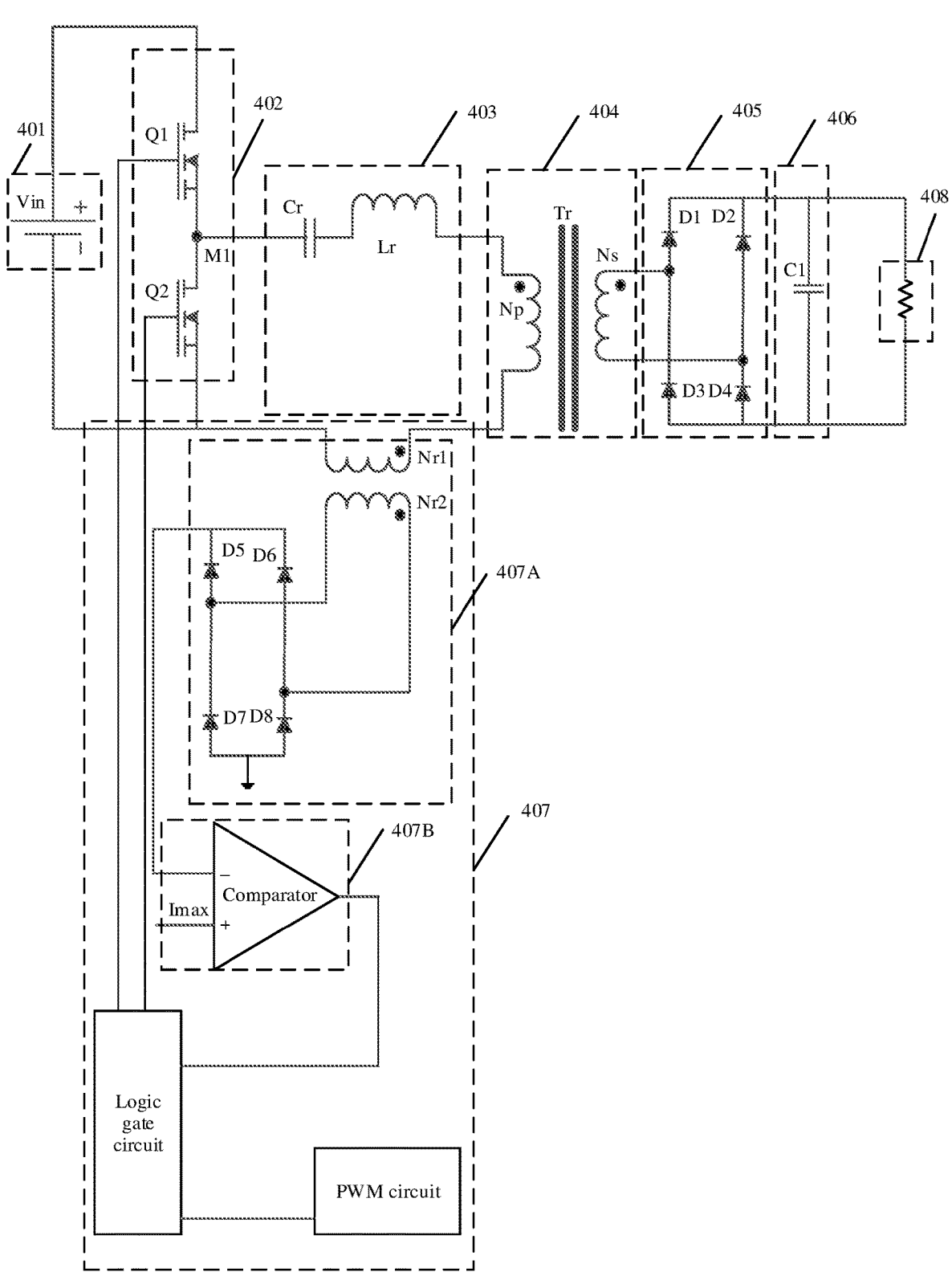
FIG. 12 is a schematic diagram of a structure of an LLC converter.

In some embodiments, the LLC converter provided in this application may be a half-bridge LLC resonant circuit. The switch circuit 402 may include two switches connected in series, for example, a first switch Q1 and a second switch Q2 that are connected in series. As shown in FIG. 12, the first switch Q1 and the second switch Q2 may be connected in series between a positive electrode and a negative electrode of the first power supply 401. The control circuit 407 may be separately connected to the first switch Q1 and the second switch Q2, and is configured to drive the first switch Q1 and the second switch Q2.

In the LLC converter provided in this application, the switch circuit 402 may include a primary-side switch of a full-bridge resonant converter. The switch in the switch circuit 402 may be an insulated gate bipolar transistor, an integrated gate-commutated thyristor, a gate turn-off thyristor, a silicon controlled rectifier device, a junction field effect transistor device, a metal oxide semi-conductor field effect transistor controlled thyristor device, a gallium nitride-based power device, or the like.

The resonant tank 403 mainly includes a resonant inductor Lr and a resonant capacitor Cr. In some embodiments, the resonant tank 403 may further include an excitation inductor Lp. As shown in FIG. 12, one end of the resonant tank 403 may be connected to a first node M1, and the other end may be connected to the conversion circuit 404. The first node M1 is a connection point between the first switch Q1 and the second switch Q2. The resonant tank 403 may be connected to one electrode of the first power supply 401 by using the conversion circuit 404 and the control circuit 407, and may be connected to the other electrode of the first power supply 401 by using the switch circuit 402.

The conversion circuit 404 may include a primary-side winding Np, a transformer Tr, and a secondary-side winding Nr. In some embodiments, the conversion circuit 404 may include one or more secondary-side windings Sr. One end of the primary-side winding Np is connected to the resonant tank 403, and the other end is connected to the control circuit 407.

The rectifier circuit 405 may convert an alternating current provided by the conversion circuit 404 into a direct current. The rectifier circuit 405 may include a plurality of diodes, or include a plurality of switches. Two input ends of the rectifier circuit 405 may be connected to the secondary-side winding Nr in the conversion circuit 404. The rectifier circuit 405 shown in FIG. 12 may include two parallel branches, and each branch includes two diodes connected in series. A cathode of a first diode in the two diodes is connected to an anode of a second diode, and a connection point between the first diode and the second diode is an input end of the rectifier circuit 405. Cathodes of first diodes on the two branches are connected, and anodes of second diodes on the two branches are connected.

The output circuit 406 may include an output capacitor C1. One end of the output capacitor C1 may be separately connected to a cathode of a first diode in each of the two branches of the rectifier circuit 405, and the other end of the output capacitor C1 may be separately connected to an anode of a second diode in each of the two branches of the rectifier circuit 405.

When the LLC converter is in the steady state phase, the output circuit 406 may stably provide the second voltage for a load 408. The output circuit 406 includes at least the output capacitor, and the output capacitor may be further connected between two ends of the rectifier circuit 405. In different application scenarios, the output circuit 406 may include an output filter including a capacitor.

In the control circuit 407, the current collection unit 407A may include a current transformer (current transformer, CT) sampling circuit, and is coupled to the resonant tank 403. The CT sampling circuit may include a first winding Nr1, a second winding Nr2, and a plurality of diodes. One end of the first winding Nr1 may be connected to the primary-side winding Np in the conversion circuit 404, and the other end is connected to the first power supply 401. The plurality of diodes may be on the two branches, and each branch may include two diodes connected in series. A cathode of a third diode in the two diodes is connected to an anode of a fourth diode, a cathode of a fourth diode is connected to the logical signal generating power supply 407B, and an anode of the third diode is connected to a ground cable. For example, in FIG. 12, a cathode of a diode D7 is connected to an anode of a diode D5, and a cathode of a diode D8 is connected to an anode of a diode D6. Two ends of the second winding Nr2 are respectively connected to connection points that each are between two diodes on a branch. In some embodiments, the CT sampling circuit may alternatively be any current transformer. This is not excessively limited in this application.

The logical signal generation unit 407B may include at least one comparator, and a first input end of the comparator is connected to an output end of the CT sampling circuit. As shown in FIG. 12, cathodes of fourth diodes on two branches of the CT sampling circuit are output ends of the CT sampling circuit, and the first input end of the comparator may be connected to the cathodes of the fourth diodes on the two branches. A second input end of the comparator is connected to a fixed level corresponding to the current threshold.

The first drive signal generation unit 407C may include a pulse width modulation (pulse width modulation, PWM) circuit. The second drive signal generation unit 407D may include a plurality of logic gate circuits, for example, an AND logic gate circuit. A first input end of each AND logic gate circuit is connected to an output end of the comparator, a second input end of each AND logic gate circuit is connected to an output end of the PWM circuit, and an output end of each AND logic gate circuit may be connected to a corresponding switch.

Figure 13:
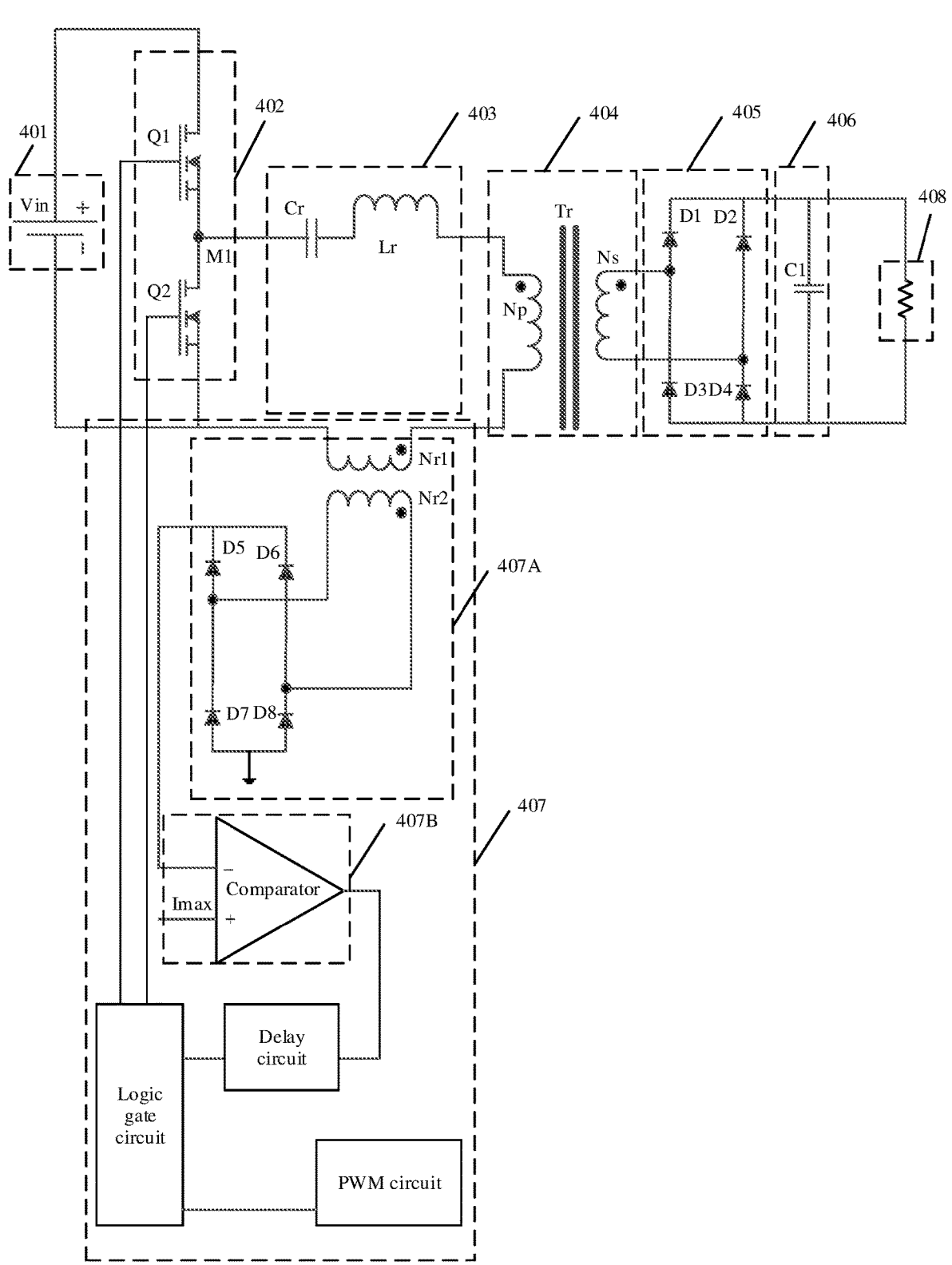
FIG. 13 is a schematic diagram of a structure of an LLC converter.

The delay unit 407E may include a delay circuit. As shown in FIG. 13, an input end of the delay circuit may be connected to the output end of the comparator, and an output end of the delay circuit may be connected to the first input end of the AND logic gate circuit.

Figure 14:
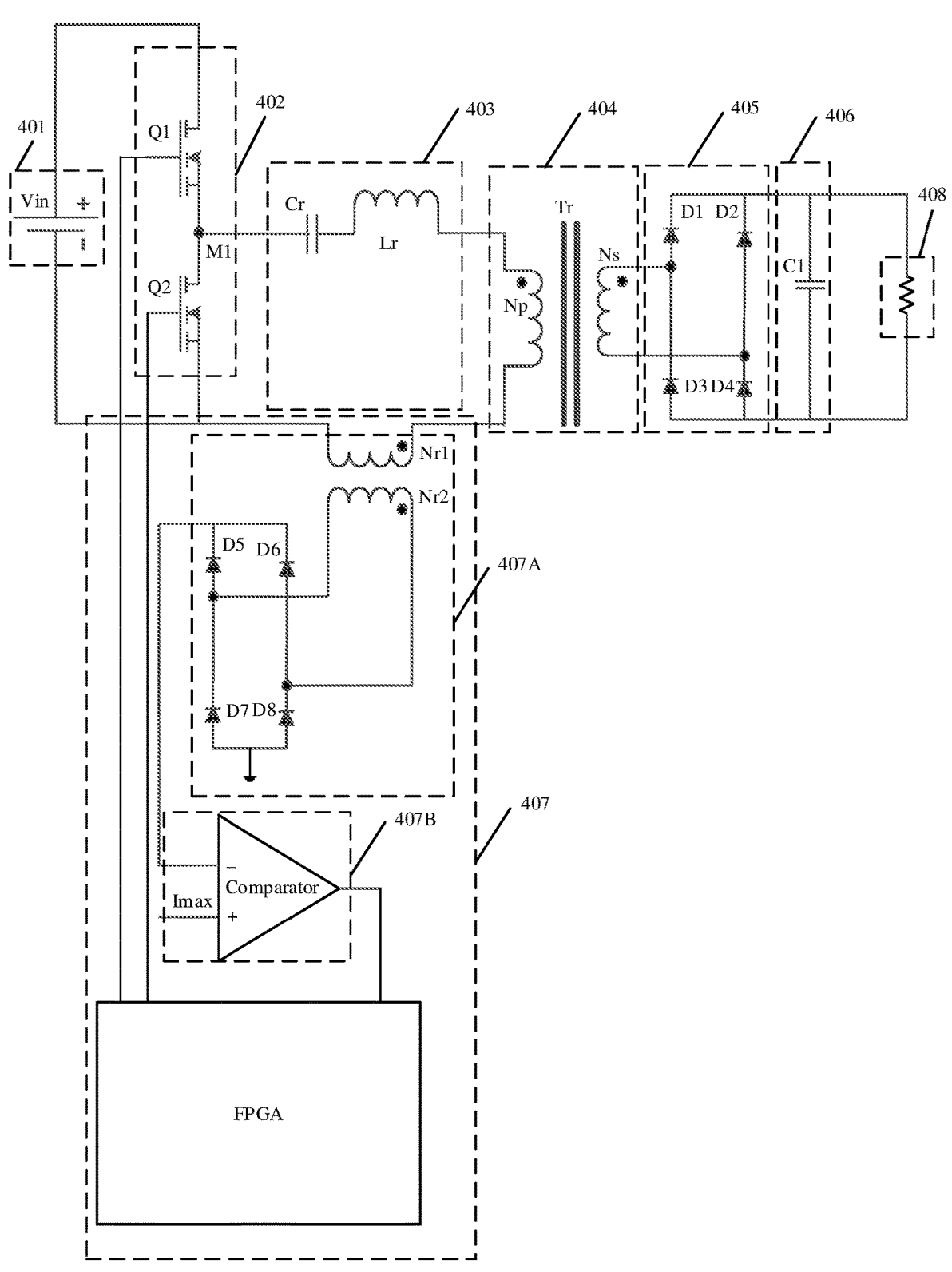
FIG. 14 is a schematic diagram of a structure of an LLC converter.

In a possible implementation, a plurality of units included in the control circuit 407 may be implemented as an integrated circuit, for example, a field programmable gate array (field programmable gate array, FPGA) circuit or a digital signal processing (digital signal processing, DSP) circuit. For example, as shown in FIG. 14, the control circuit 407 may include an FPGA circuit or a DSP circuit, and the FPGA circuit or the DSP circuit is used to implement functions and roles of the delay unit 407E, the first drive signal generation unit 407C, the second drive signal generation unit 407D, and the like.

In this embodiment of this application, specific constituent elements of a plurality of parts such as the output circuit 406, the rectifier circuit 405, the conversion circuit 404, the resonant tank 403, the switch circuit 402, and the first power supply 401, and a connection manner between the elements are merely used as an example for description, and do not constitute a specific limitation on the plurality of parts. An LLC converter soft start method provided in an embodiment of this application is applied to a wide LLC converter or LLC circuit. A person skilled in the art may adjust the specific constituent elements of the plurality of parts in the LLC converter and the connection manner between the elements based on an actual application scenario, to implement functions and roles of the plurality of parts in this embodiment of this application.

Figure 15:
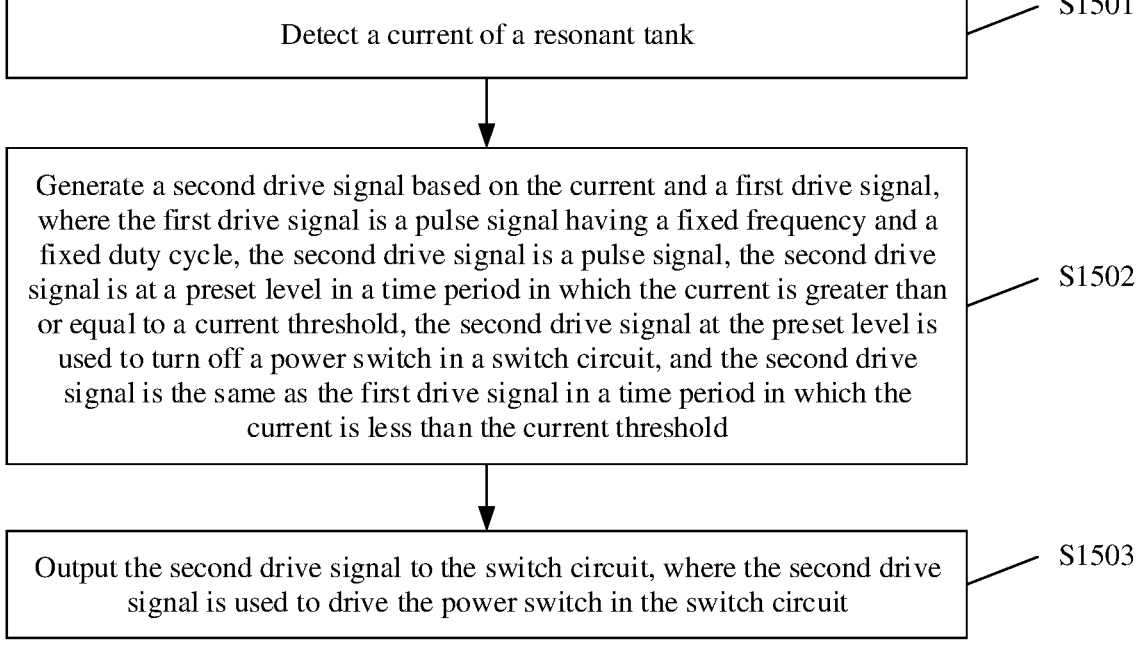
FIG. 15 is a schematic flowchart of an LLC converter soft start method.

An embodiment of this application further provides an LLC converter soft start method. The method may be applied to any one of the foregoing LLC converters. The method may be performed by a controller or a control circuit. As shown in FIG. 15, the method may include the following steps.

Step S1501: The controller detects a current of a resonant tank.

Step S1502: The controller generates a second drive signal based on the current and a first drive signal, where the first drive signal is a pulse signal having a fixed frequency and a fixed duty cycle, the second drive signal is a pulse signal, the second drive signal is at a preset level in a time period in which the current is greater than or equal to a current threshold, the second drive signal at the preset level is used to turn off a power switch in the switch circuit, and the second drive signal is the same as the first drive signal in a time period in which the current is less than the current threshold.

Step S1503: The controller outputs the second drive signal to the switch circuit, where the second drive signal is used to drive the power switch in the switch circuit.

In this embodiment of this application, the controller may generate the second drive signal based on a case of the current of the resonant tank and a case of a level of the first drive signal, and output the second drive signal to the switch circuit, to drive the switch in the switch circuit. The following provides an example in which a signal at a first level may drive the switch to be in an on state, and a signal at a second level may drive the switch to be in an open-circuit state. If the current of the resonant tank is less than the current threshold and the first drive signal is at the first level, a level of the generated second drive signal is the first level. If the current of the resonant tank is greater than or equal to the current threshold and the first drive signal is at the first level, the level of the generated second drive signal is the second level. It can be learned that, when the current of the resonant tank is greater than or equal to the current threshold, the controller may use the second drive signal at the second level to enable the switch to be in the open-circuit state, to avoid generating a current impulse in the resonant tank and protect the power switch in the LLC converter. If the first drive signal is at the second level, regardless of whether the current of the resonant tank is greater than the current threshold, the level of the second drive signal generated by the controller is the second level, so that the switch is in the open-circuit state. Optionally, the fixed frequency is a resonance frequency corresponding to the resonant tank.

It should be understood that the soft start method provided in this embodiment of this application may be not only applied to a start phase, but also may be applied to a steady state phase. After the LLC converter enters the steady state phase, no large current impulse is generated in the resonant tank usually. Therefore, the second drive signal generated by the controller is the same as the first drive signal, in other words, is a pulse signal having a fixed frequency and a fixed duty cycle.

In a possible implementation, before generating the second drive signal based on the current and the first drive signal, the controller may further perform the following operation:

generating a logical signal based on the current and the current threshold, where the logical signal is a pulse signal, the current is less than the current threshold in a time period corresponding to a width of a pulse in the logical signal, and the current is greater than or equal to the current threshold within a time interval between two adjacent pulses in the logical signal.

The generating a second drive signal based on the current and a first drive signal includes:

performing AND logical operation processing on the logical signal and the first drive signal, to obtain the second drive signal.

For example, the controller may perform the AND (AND) operation on the logical signal and the first drive signal, and use an operation result as the second drive signal.

In this embodiment of this application, the LLC converter may include a PWM circuit, configured to generate a drive signal of a switch in the steady state phase. The PWM circuit generates the first drive signal having the fixed frequency and the fixed duty cycle in the start phase and the steady state phase of the LLC converter. The controller may adjust the drive signal of the switch in the steady state phase, to obtain a drive signal of the switch in the start phase, and does not change an operating mode of the PWM circuit, so that control complexity of the LLC converter can be reduced, and control efficiency can be improved.

In a possible implementation, the logical signal is a pulse signal; and before generating the first drive signal based on the current and the second drive signal, the controller may further delay at least one of a rising edge or a falling edge of the pulse in the logical signal by preset duration.

In this embodiment of this application, the controller performs delay processing on the logical signal, so that when the controller adjusts the first drive signal based on the logical signal, a start moment of an on time period in the second drive signal is delayed, to delay turning on the switch in the LLC converter.

Figure 16:
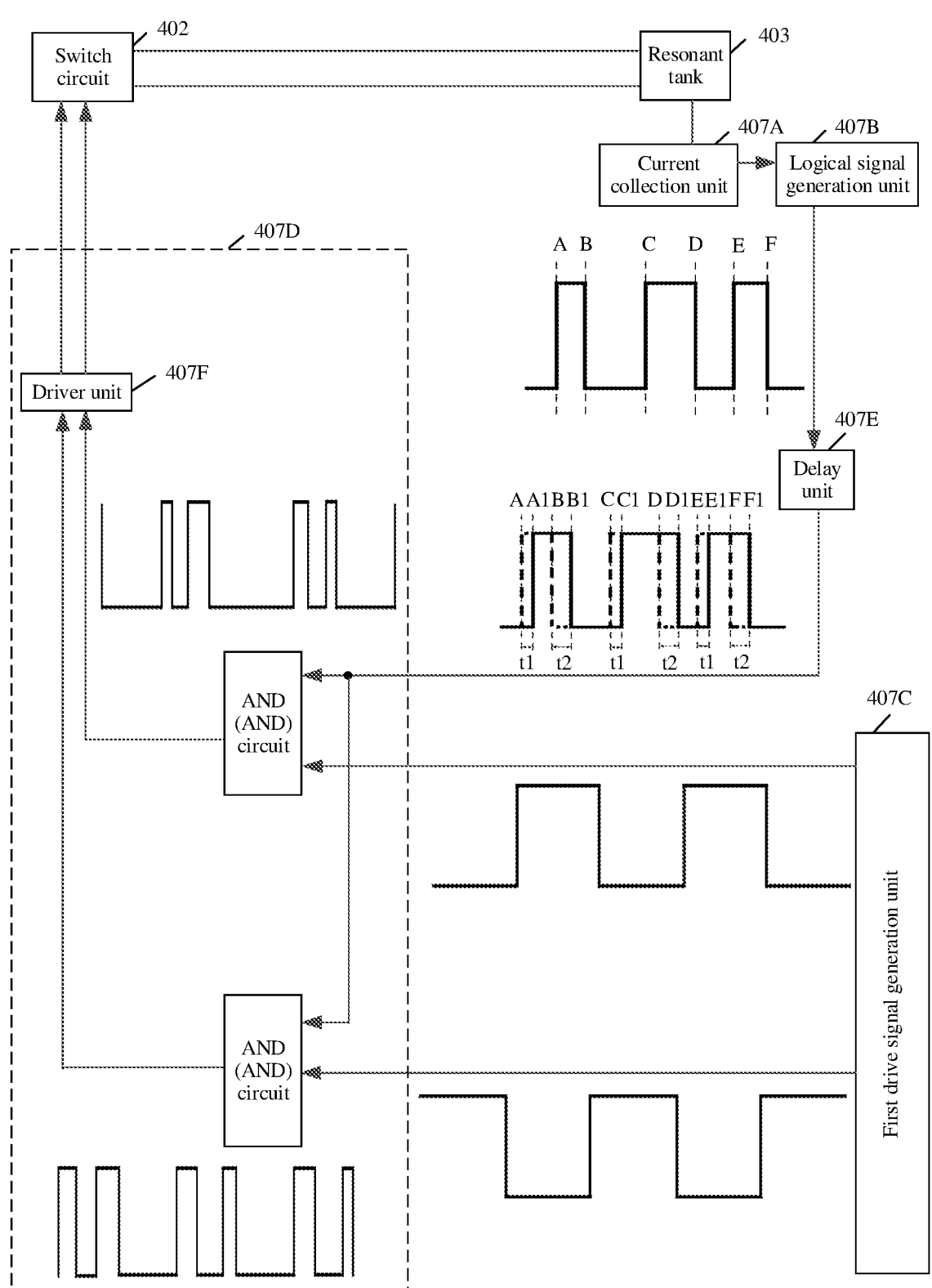
FIG. 16 is a schematic diagram of a control process of an LLC converter soft start method.

For ease of understanding of the LLC converter soft start method provided in this application, a control process in which the controller or the control circuit shown in FIG. 16 implements the method is described below by using a control circuit 407 as an example.

A current collection unit 407A in the control circuit 407 may detect a current signal of a resonant tank 403 of the LLC converter, and transmit the current signal to a logical signal generation unit 407B. For example, the current collection unit 407A may include a CT sampling circuit. The logical signal generation unit 407B may include a comparator. The logical signal generation unit 407B may compare the current signal and a current threshold, and output a logical signal. For example, a low level indicates an overcurrent, and a high level indicates no overcurrent. As shown in FIG. 16, in the signal output by the logical signal generation unit, an amplitude of a signal between a moment A and a moment B is a high level, and an amplitude of a signal between the moment B and a moment C is a low level.

The logical signal generation unit 407B may output, in real time, a signal representing whether a current of the resonant tank 403 is an overcurrent. A delay unit 407E performs delay processing on the signal. For example, a rising edge of a signal SA-B whose amplitude is a high level is delayed by first delay duration t1, or a falling edge of the signal SA-B is delayed by second delay duration t2. The delay unit 407E may alternatively delay the rising edge of the signal SA-B by the first delay duration t1, and delay the falling edge of the signal SA-B by the second delay duration t2. In some embodiments, the first delay duration t1 and the second delay duration t2 may be configured in the delay unit 407E.

A first drive signal generation unit 407C in the control circuit 407 may include a PWM circuit, and the PWM circuit can generate a PWM signal having a fixed frequency and a fixed duty cycle. The PWM signal may be used to drive a switch in a switch circuit 402 in a steady state phase of the LLC converter. A frequency at which the PWM circuit generates the PWM signal may be approximately an inherent frequency of the resonant tank of the LLC converter. It is assumed that the switch circuit 402 includes two switches. The PWM circuit may separately generate first drive signals corresponding to the two switches, and a duty cycle of a drive signal may be approximately 50%. As shown in FIG. 16, the first drive signal generation unit 407C generates two first drive signals.

A second drive signal generation unit 407D in the control circuit 407 may adjust, based on a logical signal generated by the delay unit 407E, a drive signal that is in a steady state phase of each switch and that is generated by the first drive signal generation unit 407C.

The second drive signal generation unit 407D may include two AND (AND) logic gate circuits. One AND (AND) logic gate circuit may process the logical signal generated by the delay unit 407E and a first drive signal corresponding to a first switch in the two switches, and generate a second drive signal corresponding to the first switch. The other AND (AND) logic gate circuit may also process the logical signal generated by the delay unit 407E and a first drive signal of a second switch, and generate a second drive signal corresponding to the second switch.

The second drive signal generation unit 407D may also include a driver unit 407F, configured to apply a second drive signal generated by the AND (AND) logic gate circuit to a corresponding switch, to drive each switch. It can be learned that the control circuit 407 may flexibly adjust on duration and a turn-on moment of each switch based on an overcurrent situation of the current of the resonant tank 403, to avoid, through closed-loop control, a case in which a current impulse is generated in the resonant tank 403, affecting performance of each switch.

In an application scenario, the switch circuit 402 includes two switches. The current threshold is configured to be two times of a rated current of the resonant tank 403. The first delay duration t1 is configured as 5% of a resonance frequency (inherent frequency) corresponding to the resonant tank 403, and the second delay duration is configured as 0. A duty cycle of the first drive signal is configured as 50%, and a frequency of the first drive signal is equal to the resonance frequency corresponding to the resonant tank 403.

Figure 17:
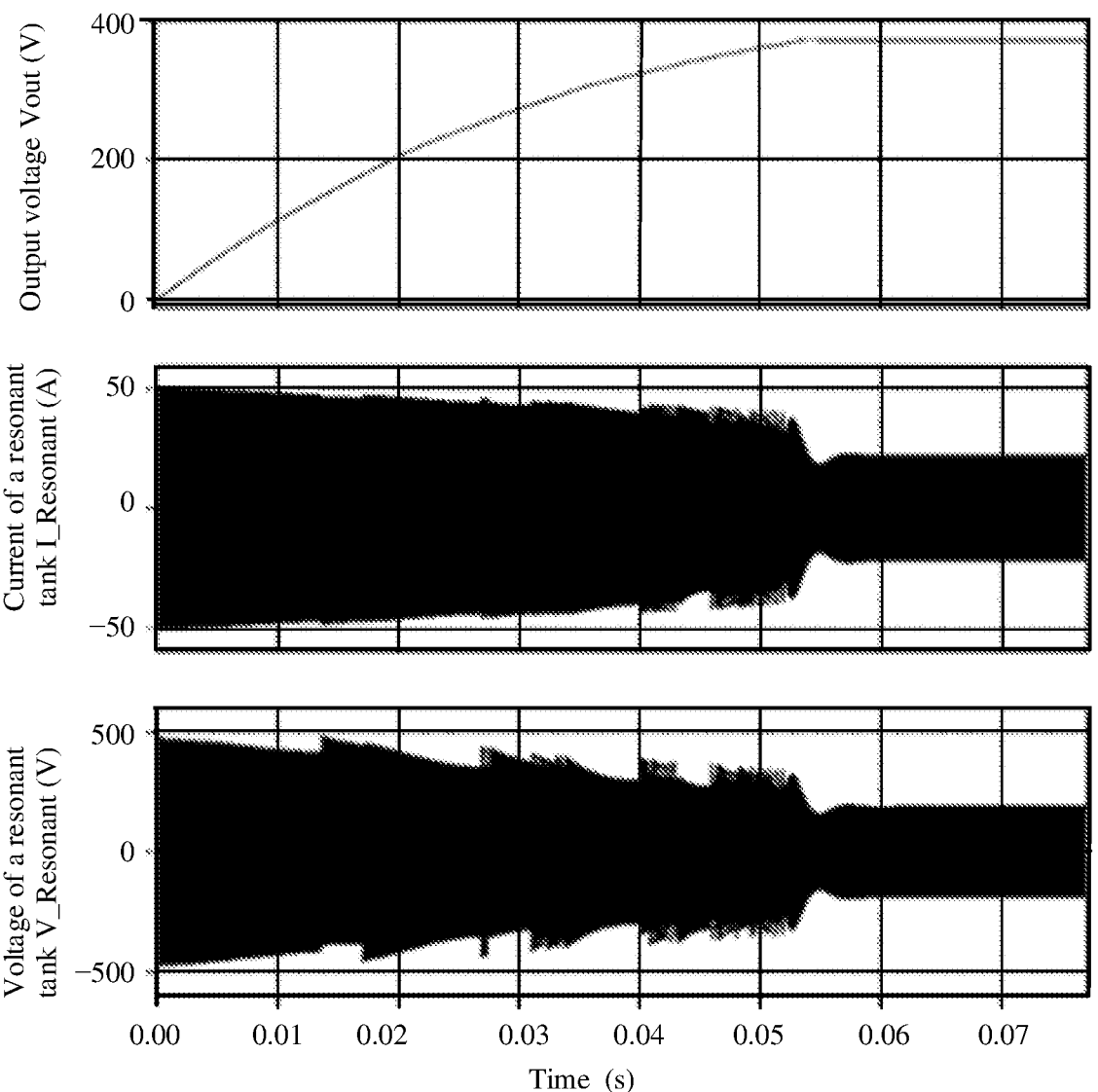
FIG. 17 is a schematic diagram of a current of a resonant tank, a voltage of a resonant capacitor, and a voltage of an output capacitor in a start phase.

In both a start phase and a steady state phase of the LLC converter, in a process in which the control circuit 407 may perform the LLC converter soft start method provided in embodiments of this application, a change status of the current (I_Resonant) of the resonant tank 403, a change status of a voltage (V_Resonant) of a resonant capacitor Cr, and a change status of an output voltage (Vout) of an output capacitor C1 are shown in FIG. 17.

Figure 18:
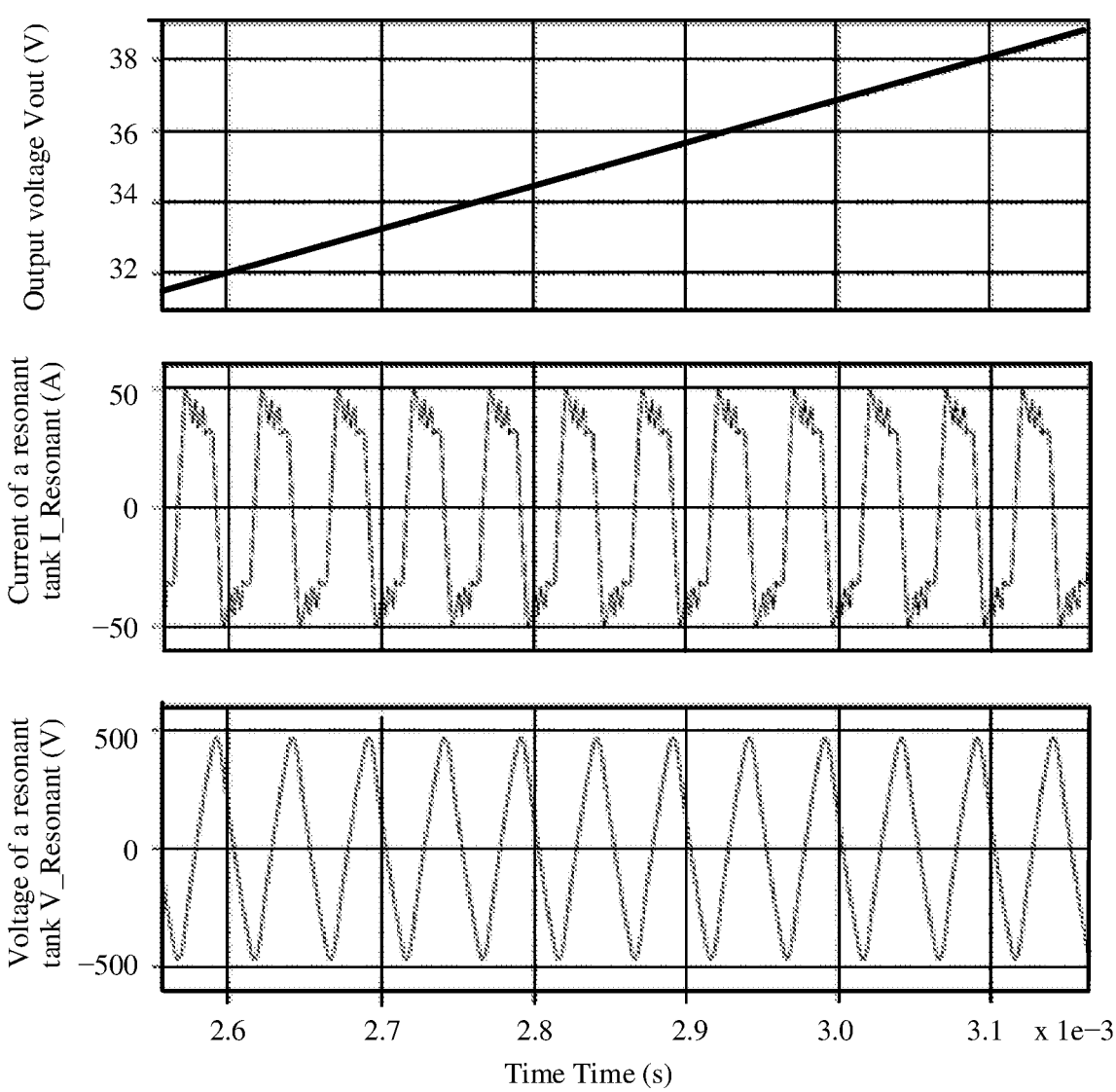
FIG. 18 is a schematic diagram of a current of a resonant tank, a voltage of a resonant capacitor, and a voltage of an output capacitor in a start phase.
Figure 19:
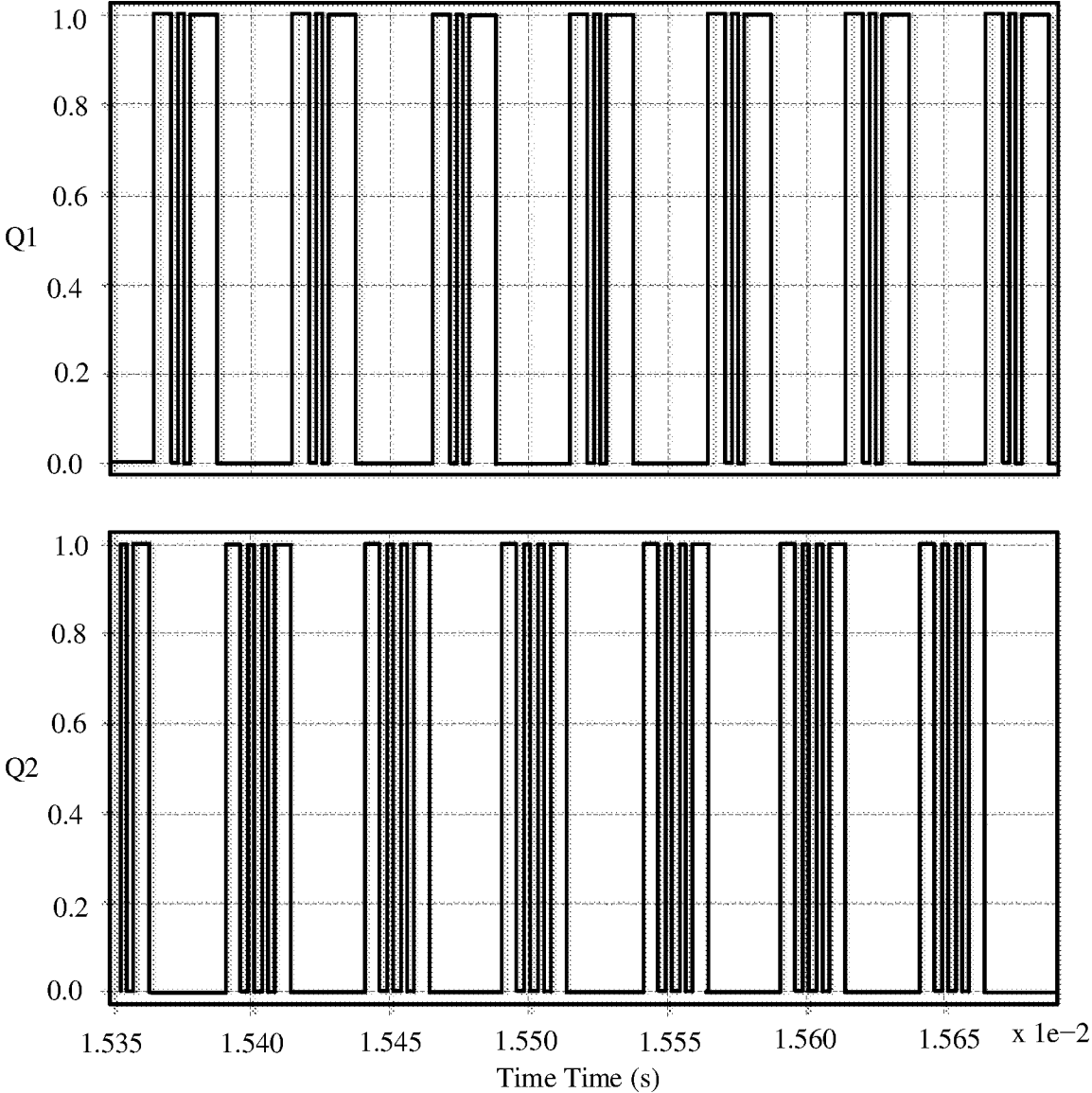
FIG. 19 is a schematic diagram of a drive signal of a switch in a start phase of an LLC converter.

FIG. 18 shows a change status of a current (I_Resonant) of a resonant tank 403, a change status of a voltage (V_Resonant) of a resonant capacitor Cr, and a change status of an output voltage (Vout) of an output capacitor C1 in a local time period in a start phase of an LLC converter in a process in which a control circuit 407 performs an LLC converter soft start method according to an embodiment of this application. FIG. 19 shows a signal (corresponding to the second drive signal generated by the second drive signal generation unit 407D in the foregoing embodiments) for driving a switching transistor by a control circuit 407 in a start phase of an LLC converter.

Figure 20:
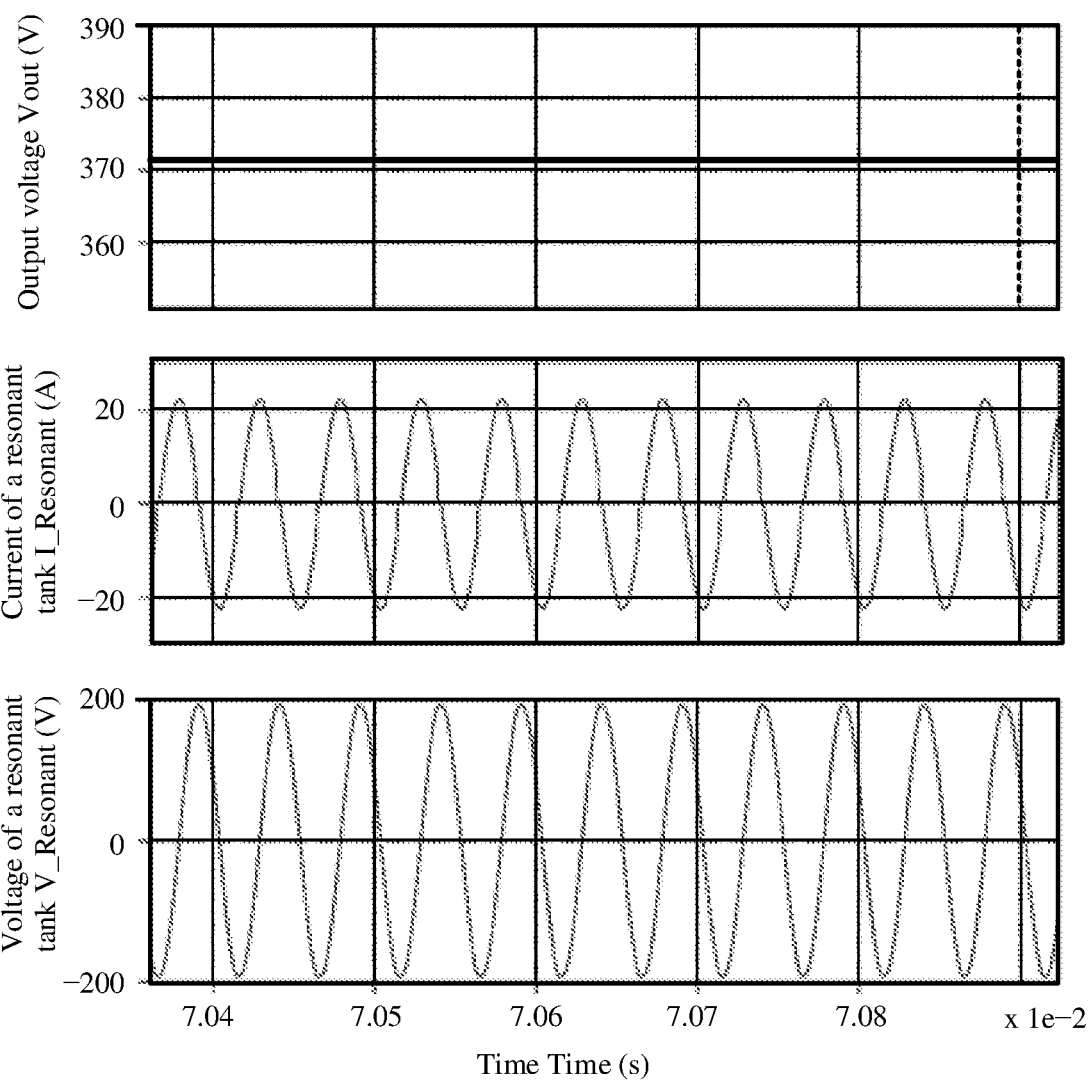
FIG. 20 is a schematic diagram of a current of a resonant tank, a voltage of a resonant capacitor, and a voltage of an output capacitor in a steady state phase.
Figure 21:
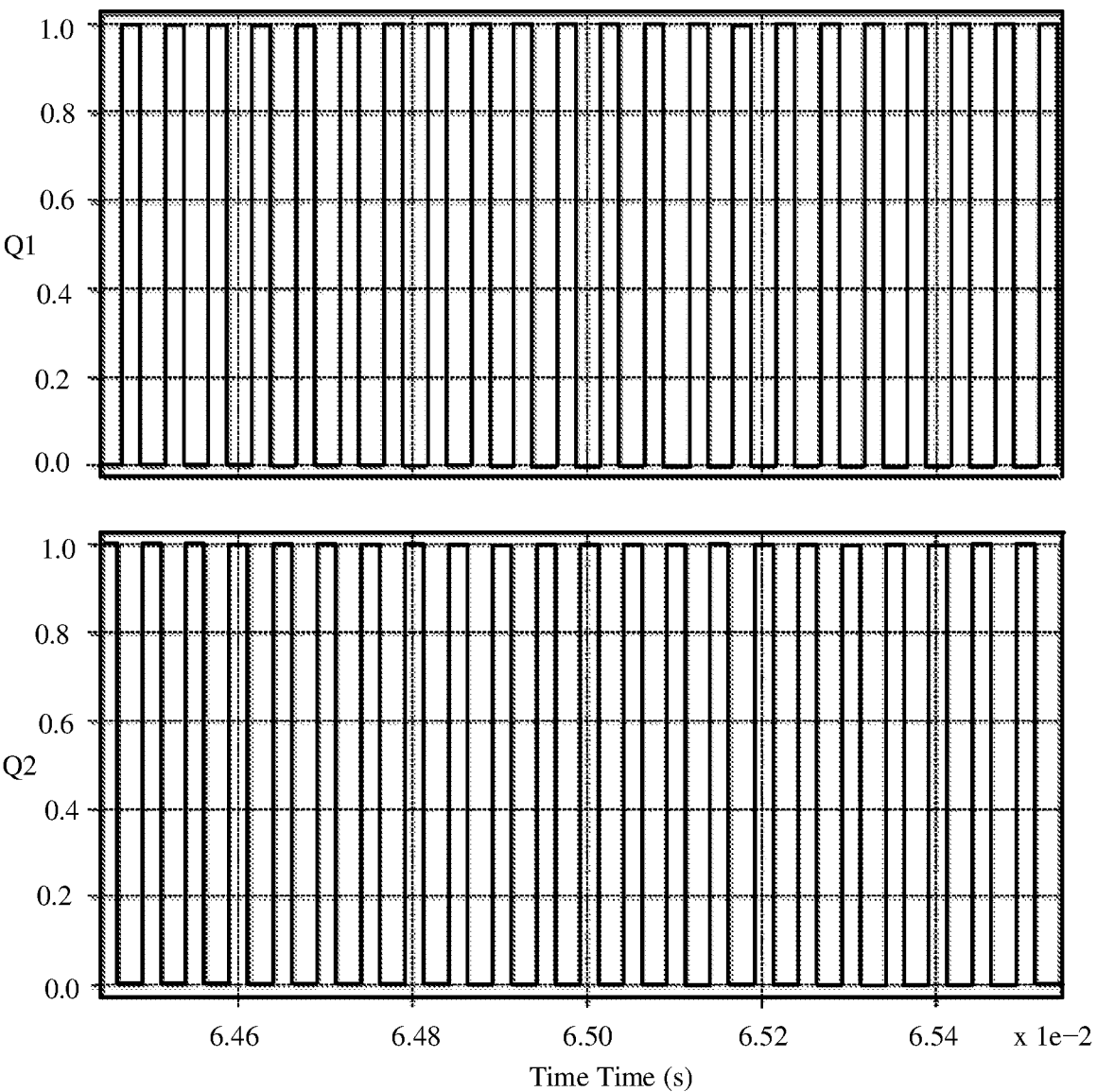
FIG. 21 is a schematic diagram of a drive signal of a switch in a steady state phase of an LLC converter.

FIG. 20 shows a change status of a current (I_Resonant) of a resonant tank 403, a change status of a voltage (V_Resonant) of a resonant capacitor Cr, and a change status of an output voltage (Vout) of an output capacitor C1 in a local time period in a steady state phase of an LLC converter. The current of the resonant tank 403 enters a steady state, and a waveform of the current is a sine wave. FIG. 21 shows a signal (corresponding to a drive signal generated by a first drive signal generation unit 407C in the foregoing embodiments) for driving a switching transistor by a control circuit 407 in a steady state phase of an LLC converter.

In this embodiment of this application, in the start phase of the LLC converter, the output voltage stably rises to a steady-state value within 55 ms. Compared with a soft start method in which a high-frequency switching frequency is used in a soft start phase in a related technology, in this embodiment of this application, a soft start time period is 40% of a soft start time period in the foregoing related technology. In addition, the current of the resonant tank 403 is limited within a specific range (current threshold), so that the resonant tank 403 has a current that is as large as possible but does not damage a component, to quickly establish the output voltage.

Figure 22:
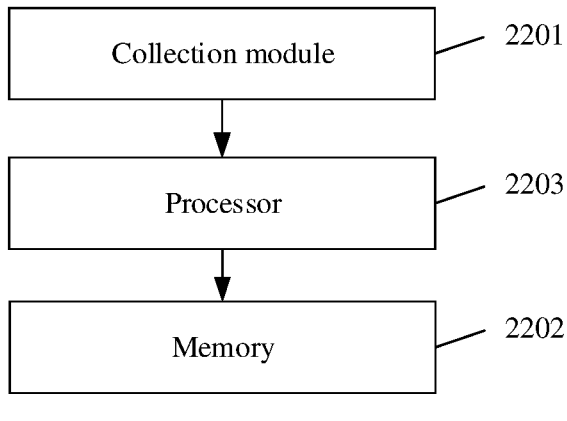
FIG. 22 is a schematic diagram of a structure of an LLC converter control apparatus.

An embodiment of this application further provides an LLC converter start apparatus. As shown in FIG. 22, the apparatus may include a collection module 2201, a memory 2202, and a processor 2203.

The collection module 2201 is coupled to a resonant tank 403 in the LLC converter, and is configured to detect a current of the resonant tank 403. The collection module 2201 may include a CT sampling circuit, and transmit a detected current signal to the processor 2203.

The memory 2202 is coupled to the processor 2203, and is configured to store program instructions or code.

The processor 2203 is coupled to the collection module 2201, and may execute the program instructions or code stored in the memory 2201, to implement a process of generating a second drive signal based on the current of the resonant tank in the foregoing embodiments.

In a possible design, the collection module 2201 may be integrated into the processor 2203. In other words, the processor 2203 may include the collection module 2201, so that the processor 2203 has a function of the collection module 2201.

In addition, an embodiment of this application further provides a computer program product, including program instructions or code. When the program instructions are run on a processor or a controller, the program instructions are used to enable the processor or the controller to perform steps of the LLC converter soft start method according to various example implementations of this application.

An embodiment of this application further provides a readable storage medium for storing the foregoing computer program product. The readable storage medium provided in embodiments of this application may be but is not limited to an electrical system, apparatus, or device, a magnetic system, apparatus, or device, an optical system, apparatus, or device, an electromagnetic system, apparatus, or device, an infrared system, apparatus, or device, or a semiconductor system, apparatus, or device, or any combination thereof. More specific examples (a non-exhaustive list) of the readable storage medium include: an electrical connection including one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage component, a magnetic storage component, or any proper combination thereof.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An inductor-inductor-capacitor (LLC) converter, comprising, a control circuit separately coupled to a switch circuit and a resonant tank, the control circuit comprising:

a current collector configured to detect a current of the resonant tank, a logical signal generator configured to generate a logical signal, a first drive signal generator configured to generate a first drive signal, and a second drive signal generator configured to generate a second drive signal based on the logical signal and the first drive signal;

the switch circuit comprising a power switch;

wherein the control circuit is configured to:

detect the current of the resonant tank; and generate the second drive signal based on the current and the first drive signal, wherein the first drive signal is a pulse signal having a fixed frequency and a fixed duty cycle, the second drive signal is a pulse signal, the second drive signal is at a preset level in a time period in which the current is greater than or equal to a current threshold, the second drive signal at the preset level is configured to turn off the power switch in the switch circuit, and the second drive signal is the same frequency and duty cycle as the first drive signal in a time period in which the current is less than the current threshold, wherein the logical signal generator is configured to generate the logical signal comprising a pulse signal based on the current and the current threshold, the current is less than the current threshold in a time period corresponding to a width of a pulse in the logical signal, and the current is greater than or equal to the current threshold within a time interval between two adjacent pulses in the logical signal; and output the second drive signal to the switch circuit, wherein the second drive signal is configured to drive the power switch in the switch circuit.

2. The converter according to claim 1, wherein the second drive signal generator is specifically configured to:

perform AND logical operation processing on the logical signal and the first drive signal, to obtain the second drive signal, wherein a level of the logical signal is a high level in the time period in which the current is less than the current threshold, and the level of the logical signal is a low level in the time period in which the current is greater than or equal to the current threshold.

3. The converter according to claim 1, wherein:

the logical signal is a pulse signal, the control circuit further comprises a delay-circuit; configured to delay at least one of a rising edge or a falling edge of the pulse in the logical signal by preset duration; and the second drive signal generator is further configured to generate the second drive signal based on the delayed at least one of the rising edge or the falling edge of the pulse in the logical signal, and the first drive signal.

4. The converter according to claim 1, wherein the fixed frequency is a resonance frequency corresponding to the resonant tank.

5. The converter according to claim 1, wherein the current of the resonant tank is less than the current threshold in a steady state phase, and the second drive signal is the same frequency and duty cycle as the first drive signal.

6. A control circuit, comprising an inductor-inductor-capacitor (LLC) converter, wherein the LLC converter comprises a switch circuit and a resonant tank, the control circuit comprising, a current collector configured to detect a current of the resonant tank;

a first drive signal generator configured to generate a first drive signal, wherein the first drive signal is a pulse signal having a fixed frequency and a fixed duty cycle;

a logical signal generator configured to generate a logical signal, wherein the logical signal is a pulse signal, the current is less than a current threshold in a time period corresponding to a width of a pulse in the logical signal, and the current is greater than or equal to the current threshold within a time interval between two adjacent pulses in the logical signal; and a second drive signal generator configured to generate a second drive signal based on the logical signal and the first drive signal, wherein the second drive signal is a second pulse signal, the second drive signal is at a preset level in a time period in which the current is greater than or equal to the current threshold, the second drive signal at the preset level is configured to turn off a power switch in the switch circuit, and the second drive signal is the same frequency and duty cycle as the first drive signal in a time period in which the current is less than the current threshold.

7. The control circuit according to claim 6, wherein the second drive signal generator is specifically configured to:

perform AND logical operation processing on the logical signal and the first drive signal, to obtain the second drive signal, wherein a level of the logical signal is a high level in the time period in which the current is less than the current threshold, and the level of the logical signal is a low level in the time period in which the current is greater than or equal to the current threshold.

8. The control circuit according to claim 7, wherein the current of the resonant tank is less than the current threshold in a steady state phase, and the second drive signal is the same frequency and duty cycle as the first drive signal.

9. The control circuit according to claim 6, wherein the control circuit further comprises a delay circuit configured to delay at least one of a rising edge or a falling edge of the pulse in the logical signal by preset duration; and the second drive signal generator is further configured to generate the second drive signal based on the delayed at least one of a rising edge or a falling edge of the pulse in the logical signal, and the first drive signal.

10. The control circuit according to claim 9, wherein the logical signal generator comprises a comparator, a first input end of the comparator is connected to an output end of the current collector, a second input end of the comparator is connected to a fixed level, the fixed level is a level corresponding to the current threshold, and an output end of the comparator is connected to the second drive signal generator or the delay circuit.

11. The control circuit according to claim 6, wherein the fixed frequency is a resonance frequency corresponding to the resonant tank.

12. An inductor-inductor-capacitor (LLC) converter soft start method for a LLC converter comprising a resonant tank and a switch circuit, the soft start method comprising:

detecting a current of the resonant tank;

generating a logical signal based on a current and a current threshold, wherein the logical signal is a pulse signal, the current is less than the current threshold in a time period corresponding to a width of a pulse in the logical signal, and the current is greater than or equal to the current threshold within a time interval between two adjacent pulses in the logical signal;

then generating a second drive signal based on the current and a first drive signal, wherein the first drive signal is a pulse signal having a fixed frequency and a fixed duty cycle, the second drive signal is a pulse signal, the second drive signal is at a preset level in a time period in which the current is greater than or equal to a current threshold, the second drive signal at the preset level is used to turn off a power switch in the switch circuit, and the second drive signal has the same frequency and duty cycle as the first drive signal in a time period in which the current is less than the current threshold, including performing AND logical operation processing on the logical signal and the first drive signal to obtain the second drive signal, wherein a level of the logical signal is a high level in the time period in which the current is less than the current threshold, and the level of the logical signal is a low level in the time period in which the current is greater than or equal to the current threshold; and outputting the second drive signal to the switch circuit, wherein the second drive signal is used to drive the power switch in the switch circuit.

13. The method according to claim 12, wherein before the generating the second drive signal based on the current and the first drive signal, the method further comprises:

delaying at least one of a rising edge or a falling edge of the pulse in the logical signal by preset duration.

14. The method according to claim 12, wherein the fixed frequency is a resonance frequency corresponding to the resonant tank.

15. An inductor-inductor-capacitor (LLC) converter control apparatus, comprising a processor and a memory, the memory is configured to store a program, instructions, or code, and the processor is configured to execute the program, the instructions, or the code in the memory, to perform the method according to claim 12.

16. A nonvolatile, non-transitory computer-readable storage medium, configured to store a computer program, wherein the computer program is loaded by a processor, to perform the method according to claim 12.

17. A chip, wherein the chip is coupled to a memory, and is configured to invoke and execute computer program instructions stored in the memory, so that the method according to claim 12 is performed.

* * * * *